United States Patent [19]

Cambigue et al.

[11] 4,251,858
[45] Feb. 17, 1981

[54] PAGING, STATUS MONITORING AND REPORT COMPILING SYSTEM FOR SUPPORT, MAINTENANCE AND MANAGEMENT OF OPERATOR-SUPERVISED AUTOMATIC INDUSTRIAL MACHINES

[75] Inventors: Arthur E. Cambigue, Auburn; James M. Burton, Seattle; Jansey D. Tieden, Puyallup, all of Wash.

[73] Assignee: The Boeing Company, Seattle, Wash.

[21] Appl. No.: 18,027

[22] Filed: Mar. 6, 1979

[51] Int. Cl.³ .................. G06F 15/46; G06F 15/16
[52] U.S. Cl. .......................... 364/102; 340/147 P; 364/120; 364/200; 364/474
[58] Field of Search ............ 364/101, 102, 100, 107, 364/474, 120, 200 MS File, 900 MS File; 340/147 P, 147 R, 163, 311, 312; 235/92 PD

[56] References Cited

U.S. PATENT DOCUMENTS

| | | | |
|---|---|---|---|
| 926,386 | 6/1909 | Chappell | 235/92 PD |
| 940,444 | 11/1909 | Eingibler | 340/147 |
| 1,713,276 | 5/1929 | Goeckler | 346/34 |
| 2,267,812 | 12/1941 | Bryce | 346/34 |
| 2,985,368 | 5/1961 | Kohler et al. | 235/92 PD |
| 3,099,512 | 3/1967 | Kohler et al. | 346/34 |
| 3,344,408 | 9/1967 | Singer et al. | 364/900 |
| 3,346,696 | 10/1967 | Mann | 179/2 |
| 3,351,912 | 11/1967 | Collom et al. | 364/900 |
| 3,454,936 | 7/1969 | Bridge et al. | 364/200 |
| 3,686,653 | 8/1972 | Salenbien et al. | 340/163 X |
| 3,819,862 | 6/1974 | Hedges | 179/2 |
| 4,015,548 | 4/1977 | Schuss | 364/101 |
| 4,017,831 | 4/1977 | Tieden et al. | 340/147 P |
| 4,100,597 | 6/1978 | Fleming et al. | 364/474 |
| 4,123,794 | 10/1978 | Matsumoto | 364/101 |
| 4,124,889 | 11/1978 | Kaufman et al. | 364/200 |
| 4,145,739 | 3/1979 | Dunning et al. | 364/200 |

OTHER PUBLICATIONS

Piller, "Data Entry Unit System Including a Hierarchy of Microcontrollers," *IBM Tech. Disc. Bull.*, vol. 19, No. 3, Aug. 1976, pp. 1068, 1069.

Zimmerl, "Master–Slave Configurations with One-Chip Microprocessors," *Siemens Research and Development Reports*, Bd. 7 (1978), NR. 6; pp. 322-324.

*Primary Examiner*—Joseph F. Ruggiero
*Attorney, Agent, or Firm*—Christensen, O'Connor, Johnson & Kindness

[57] ABSTRACT

A distributed microcomputer network is interconnected with a plurality of operator-supervised, numerically controlled (N/C) machines, visual display paging boards, terminal printers and CRT/keyboard terminals for communicating operator-originated CALLs (requests for assistance) to support personnel via the paging boards and terminal printers, and for sensing and transmitting encoded signals representing the STATUS of each machine to a central control room where the current status of the various machines is displayed on a CRT and where a central data processor compiles periodic reports of the operating history of each machine and stores such reports on a permanent recording. The microcomputer network includes a separate microcomputer for each machine for receiving and concentrating CALL and STATUS data at the individual machine level. These machine microcomputers and their associated machines are divided into separate groups and each group is linked, by a serial transmit/receive data path, to a local microcomputer which further concentrates CALL and STATUS data received from the individual machine microcomputers of the associated group, and which is linked to a visual display microcomputer that controls a paging board assigned to that group of machines. A front end microcomputer, collects the CALLs from all of the local microcomputers and hence their associated display microcomputers for causing all CALLs to be displayed on all of the paging boards located throughout the plant area.

13 Claims, 18 Drawing Figures

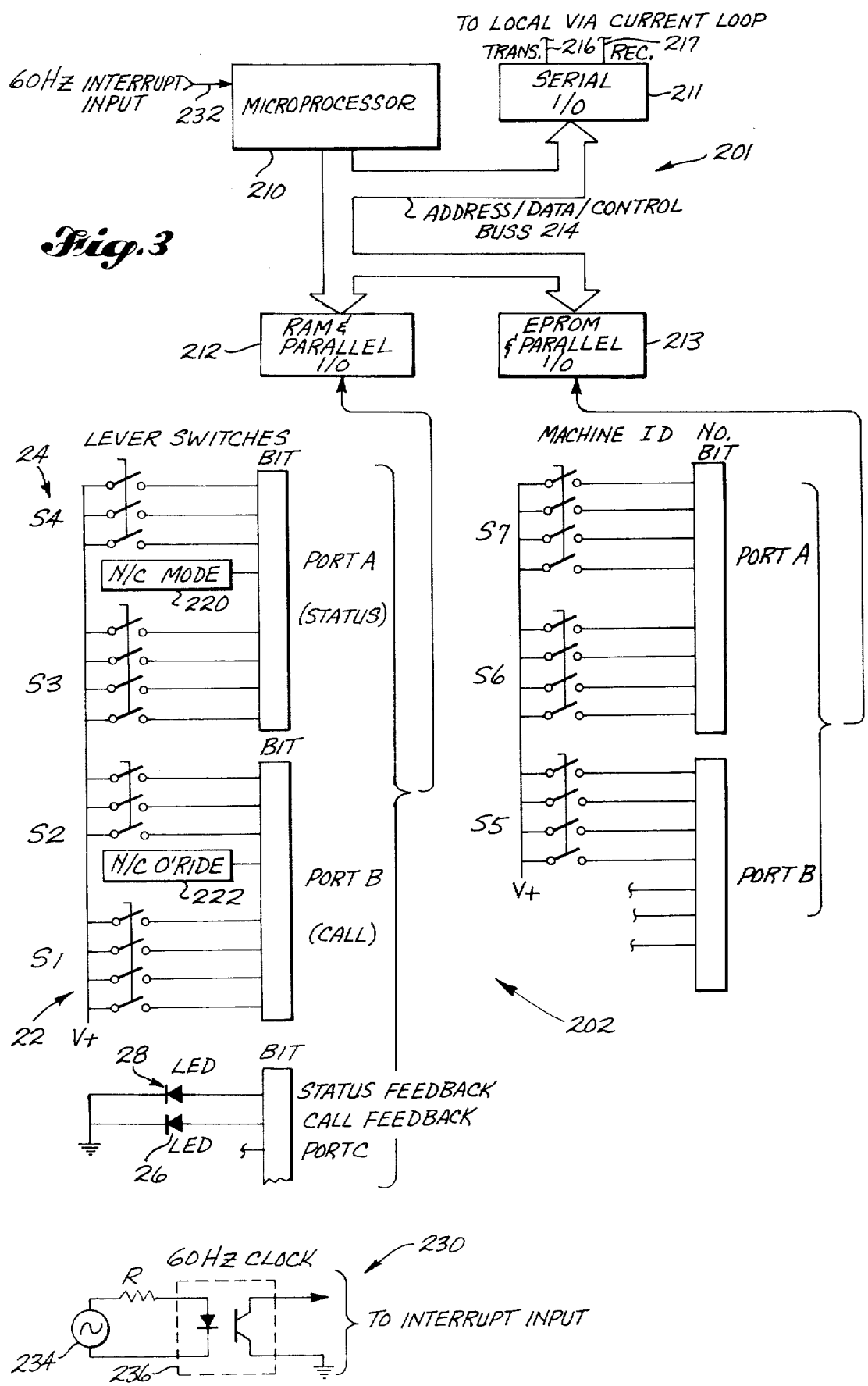

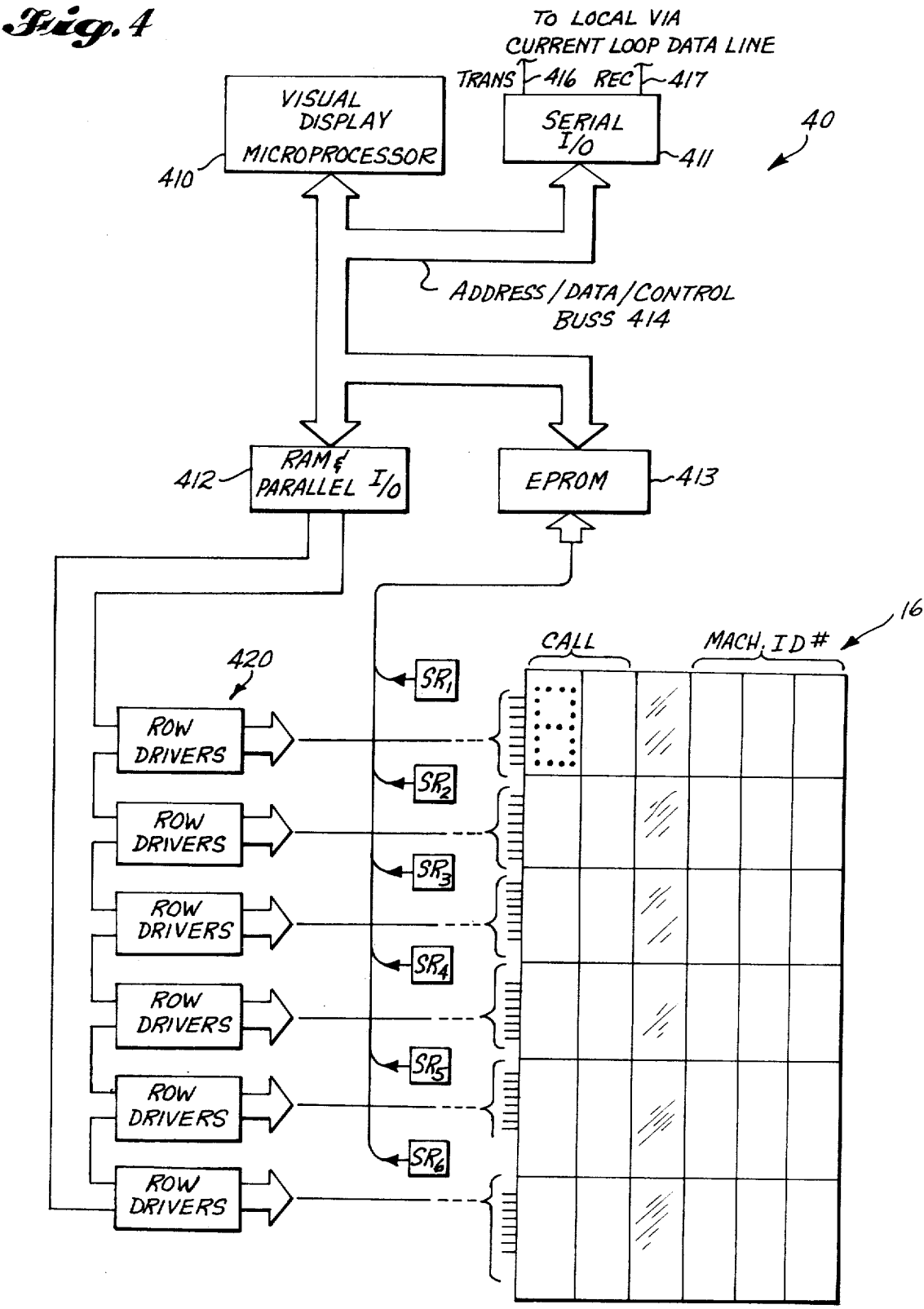

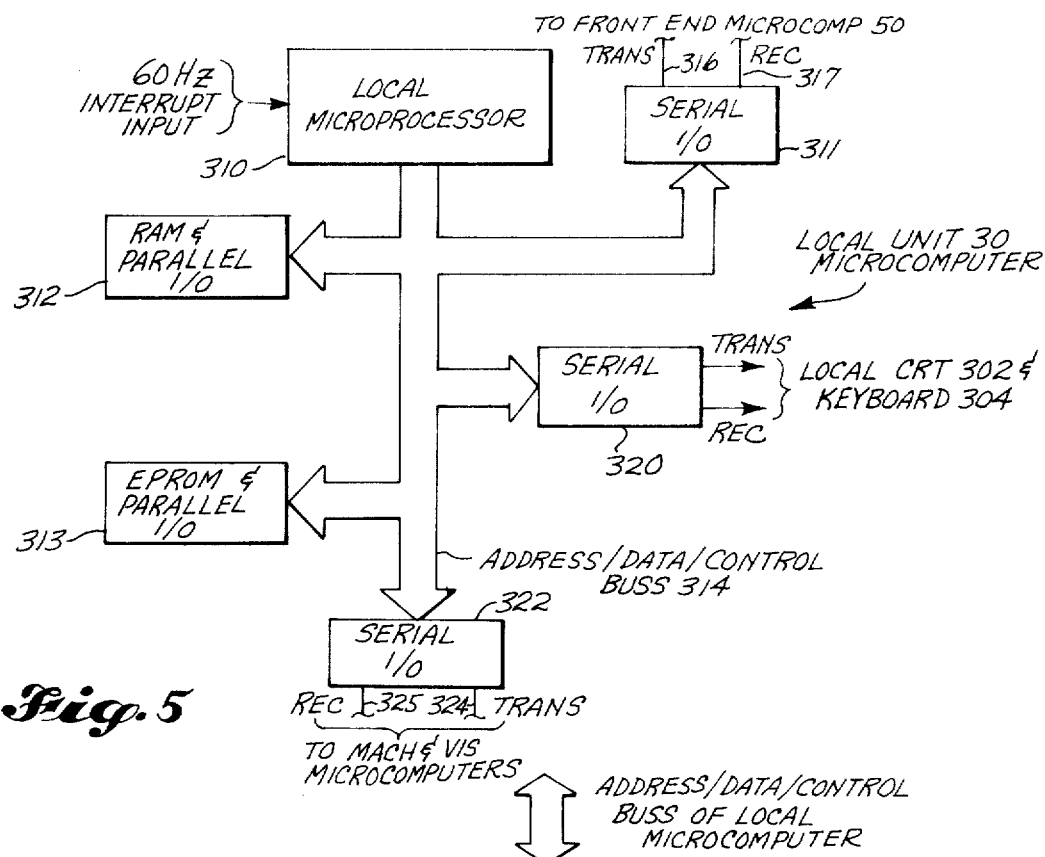
*Fig.* 5
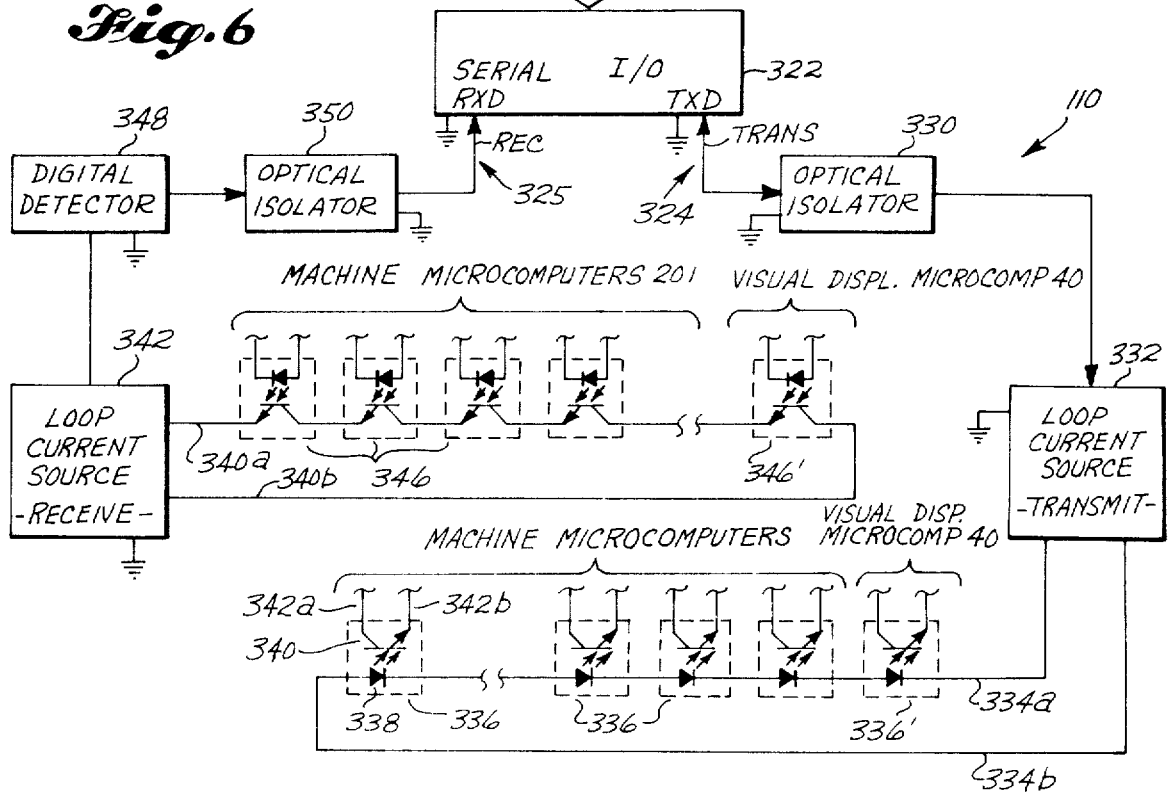
*Fig.* 6

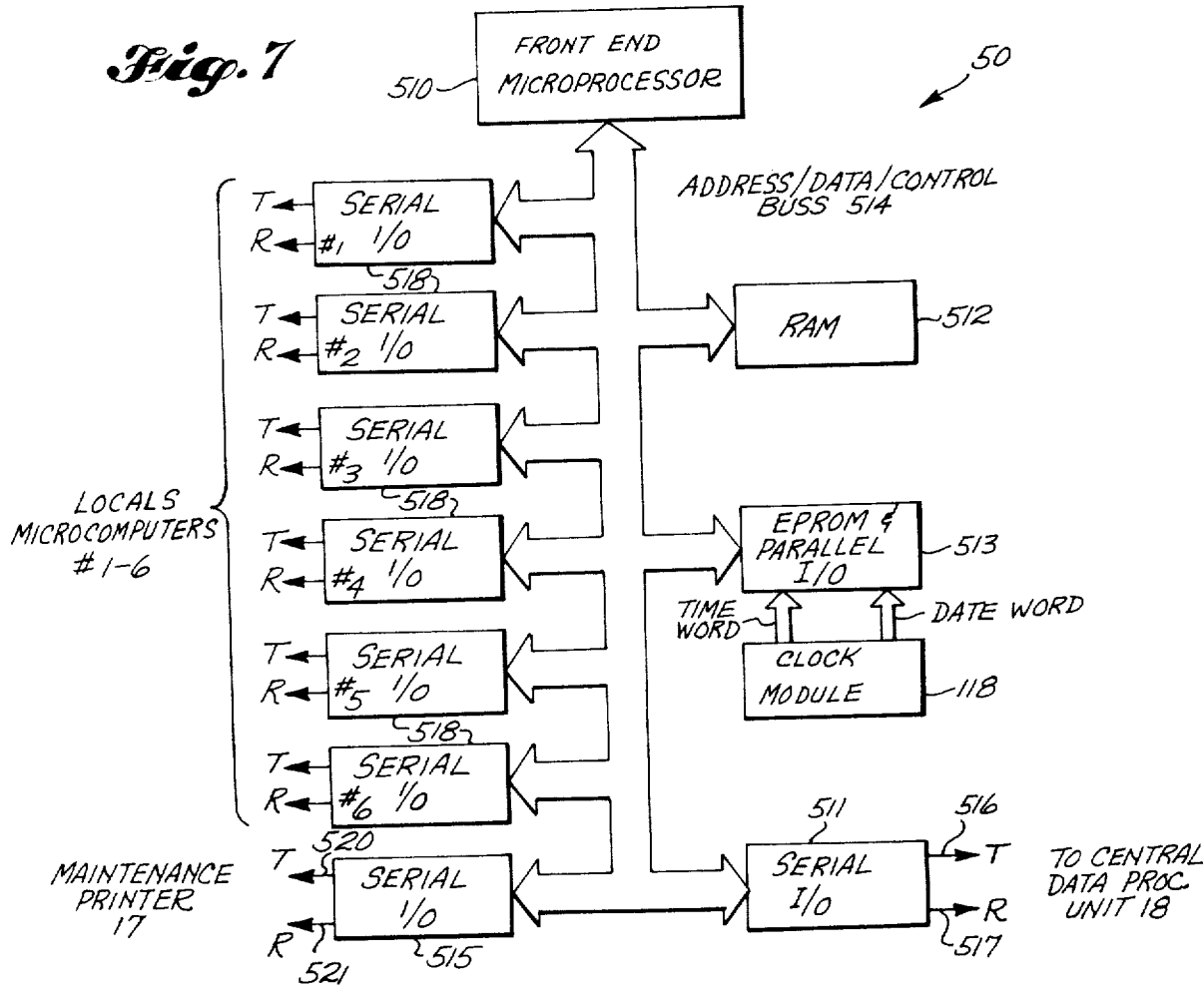

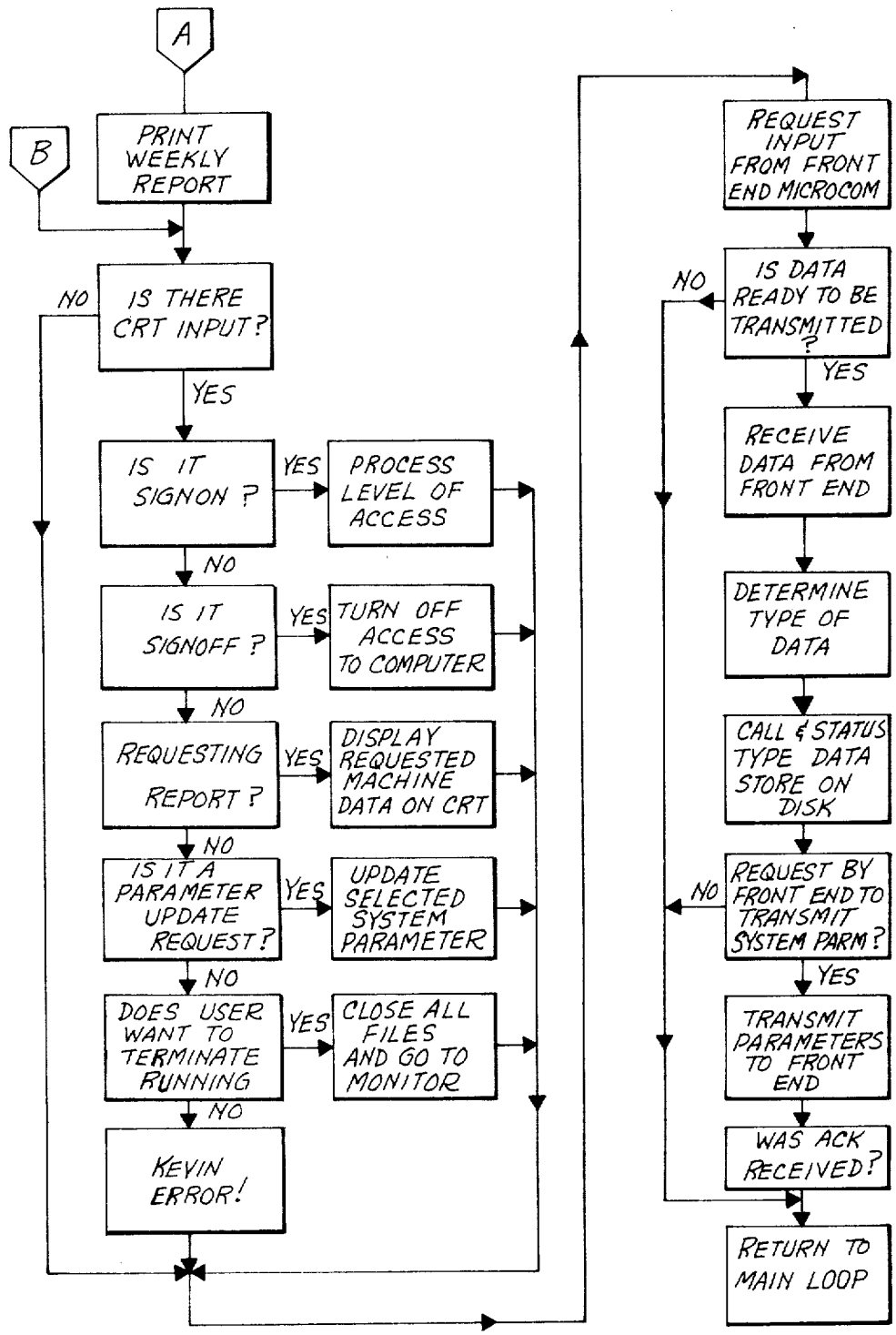
Fig. 8B  CENTRAL DATA PROCESSOR PROGRAM (CONT.)

FRONT-END MICROCOMPUTER PROGRAM

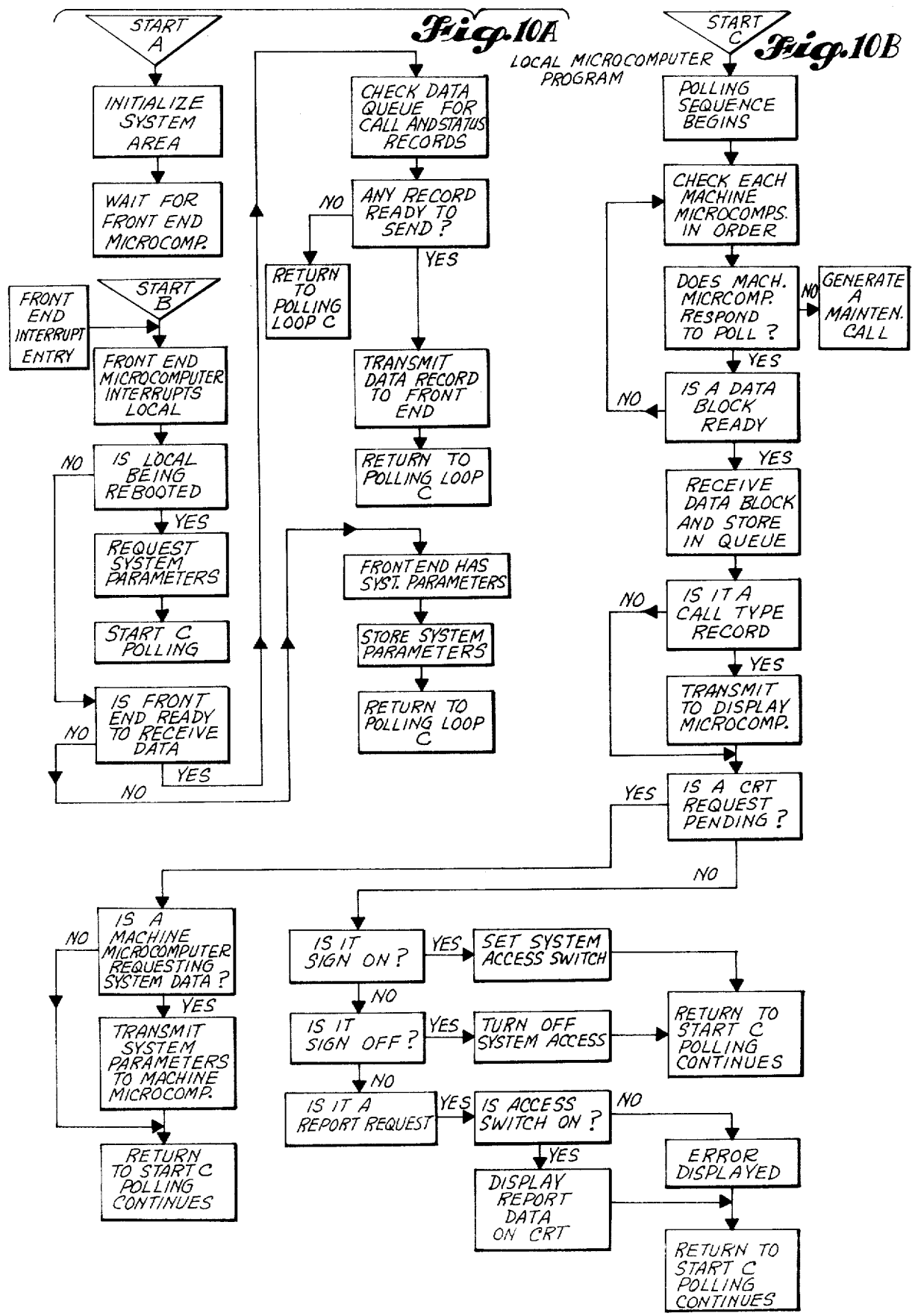

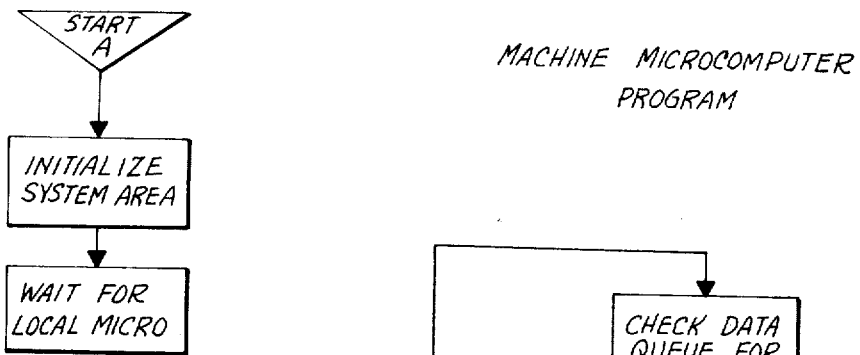
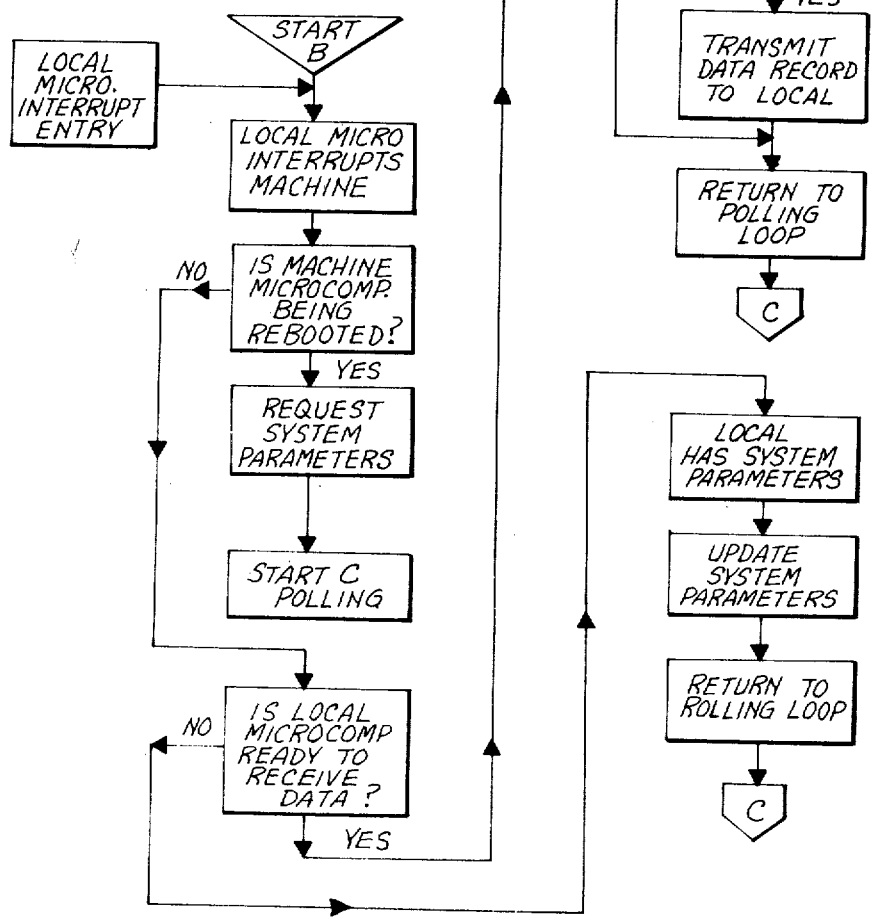

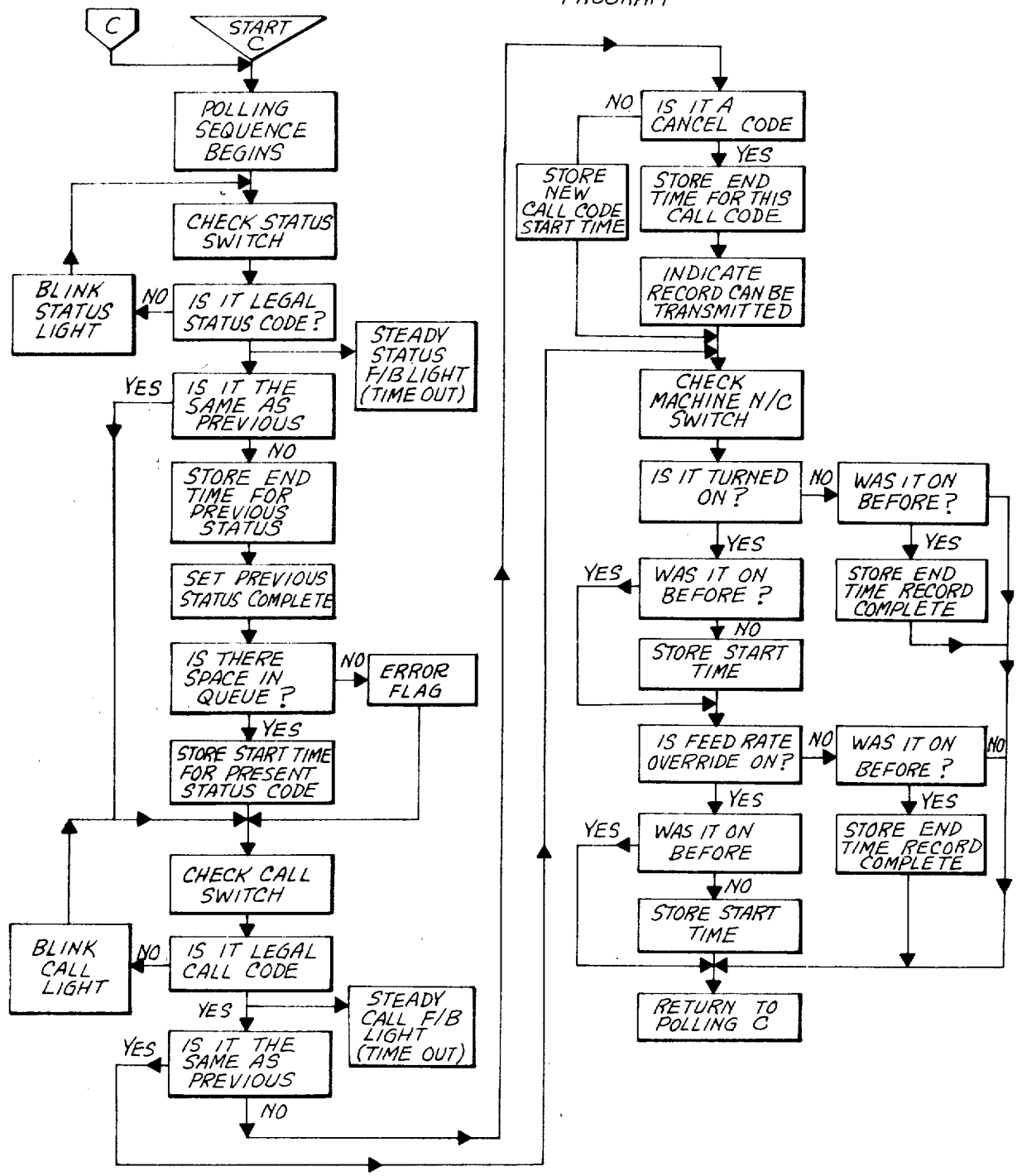
Fig. 11C  MACHINE MICROCOMPUTER (CONT) PROGRAM

DISPLAY MICROCOMPUTER PROGRAM

PAGING, STATUS MONITORING AND REPORT COMPILING SYSTEM FOR SUPPORT, MAINTENANCE AND MANAGEMENT OF OPERATOR-SUPERVISED AUTOMATIC INDUSTRIAL MACHINES

BACKGROUND OF THE INVENTION

This invention is directed to systems for improving the productivity of operator-supervised industrial machines, such as systems of the type disclosed in U.S. Pat. No. 4,017,831 for N/C MACHINE PAGING, STATUS AND REPORT SYSTEM, issued Apr. 12, 1977, by Jansey D. Tieden and Forrester E. Woodruff, Jr.

While the herein-disclosed embodiment of the invention is directed to a system for use with N/C machines, it will be appreciated that the invention has utility as a support system for other types of industrial machines. In general, the invention is useful in conjunction with operator-supervised industrial machines that are arranged close together within a given plant area, and that are operated in an environment characterized by a high level of audible noise and limited operator visibility, such that audible and visual communication between the operator and support personnel is very difficult, if not possible, and in an environment characterized by the presence of high level electrical noise due to stray electromagnetic fields such that many common forms of electrical signal communication are unsatisfactory. As discussed more fully in the above referenced U.S. Pat. No. 4,017,831, the disclosure of which is incorporated herein by reference, these and other difficulties in monitoring the performance of N/C machines led to the development of the system disclosed in that patent for enabling the machine operator to effectively call for support personnel, such as tool kitters, supervisors, etc., immediately when needed, and provide performance monitoring capability, such as real time knowledge of machine status, and compilation of historical operating data for each machine. While a paging, status and report system constructed in accordance with the disclosure in U.S. Pat. No. 4,017,831 has served its intended purpose in markedly improving the productivity of a plurality of N/C machines, the implementation and online operation of the prior system has revealed some shortcomings.

One of these shortcomings is attributed to the overall architecture of the computer network employed in the prior system. As disclosed in the above cited U.S. patent, the prior system used one central computer for collecting data and for operating the various display devices and input/output terminals. Thus, a failure of the central computer would cause the entire system to shut down.

Another practical, but perplexing, difficulty was encountered in the installation and maintenance of the prior system. Because of the architecture of the system, input modules for each N/C machine require separate cables (a set for each N/C machine module), extending from the numerous machine modules to the central computer in a remote control room. Moreover, each visual paging board of the system required separate, multiwire cabling between the central computer in the control room and the plurality of paging boards disposed at various locations throughout the shop area. As a result, the prior system required a very substantial amount of wiring between its variously located components, thereby rendering the system expensive to install, both in terms of material and labor, and costly to maintain.

Even apart from the cost of the additional wiring there are numerous situations in which existing conduits for routing wiring and cables to and from the N/C machines are already filled to capacity and will, at best, accommodate only a limited amount of additional control cabling for installation of a system of the above-characterized type. Such limited cabling capacity severely constrains the use of the prior machine support system.

In addition to the above, other shortcomings of the existing system include its susceptibility to total system shutdown upon the occurrence of certain hardware failures at the operator controlled input modules; a limitation on the expansion of the system to accommodate additional machines and in general a lack of flexibility; and, the inability of the prior system to automatically diagnose and flag specific hardware component failures.

Accordingly, an object of the present invention is to provide an industrial machine paging, status monitoring and report compiling system using a computer network design that facilitates the transmission of data between the operator-controlled imput modules located on each machine and the various computing, visual display, permanent record storage and printout devices.

Another object of the invention is to provide such a system in which the computer network is configured so that the system is tolerant of certain component failures. In other words, a malfunction of certain of the system components will not necessarily cause the entire system to shut down, rather the system will continue to operate in a limited but useful capacity.

A further object of the invention is to provide such a system with flexibility in terms of being readily expanded, or reduced, to accommodate a greater or lesser number of monitored machines.

Still a further object of the invention is to provide such a system with the capability of automatically detecting and signalling a hardware failure within certain components of the system.

SUMMARY OF THE INVENTION

In accordance with the principles of this invention, a distributed microcomputer network is employed in a paging, status monitoring and report compiling system to collect CALL and STATUS data at each of a plurality of operator-supervised industrial machines, operating in the kind of environment characterized above, and to communicate operator assistance CALL data with a plurality of visual paging boards strategically located in the plant and maintenance CALL data with a printer located in the maintenance crib, and to communicate both the CALL and STATUS data with a central data processor located in a central control room. The total number of industrial machines, which for example may be N/C machines, in a given plant area, are divided into at least first and second groups. Each machine in each such group is provided with an operator-controlled input module, which in turn incorporates a microcomputer, referred to as a machine microcomputer, for accumulating and temporarily storing digitally encoded CALL and STATUS data, entered by the machine operator via the input module. At a next higher level of the distributed microcomputer network, the first and second groups of machines are each assigned another microcomputer, called a local microcomputer which is jointly coupled to each of the machine microcomputers belonging to the same group by a party line data link. The first and second group local microcomputers each request and receive, by sequential polling operation, data that is stored in the machine microcomputers within the associated group, thus further concentrating the CALL and STATUS data. Also, each of the first and second machine groups is provided with a visual display microcomputer acting in association with a local microcomputer, for controlling the operation of a visual paging board assigned to the group. At a still higher level in the distributed microcomputer network, a front end microcomputer is provided for communicating with each of the first and second local microcomputers. The front end microcomputer in general functions to request and receive stored data from each of the local microcomputers, by carrying out a sequential polling operation; route CALL data, regardless of which local microcomputer originated such data back down the computer network to all the local microcomputers for causing all operator assistance CALL data to be displayed on every paging board; and route CALL and STATUS data to a central data processor for processing into reports and where desired, into permanent storage; and route CALL data requiring maintenance action to an output terminal in the maintenance crib.

In the present preferred form of the invention, the above mentioned party line data link that couples the group of machine microcomputers to the associated local microcomputer is provided by a common serial transfer data link in which a common, interruptable loop current is jointly coupled to each of the machine microcomputers. This form of data transmission is immune to the presence of high level electrical noise, and is capable of being conducted over readily installed transmission paths such as twisted pair conductors. Furthermore, in the preferred form of this invention, the local microcomputers are coupled to the front end microcomputer by separate, independent serial transfer data links so that a loss of one of the links will not prevent the other local microcomputers from communicating with the front end microcomputer.

Other features provided in the presently preferred embodiment include: feedback indicator lights on the operator input module that assist the operator in entering CALL and STATUS data self diagnostic capability in which malfunction in certain components of the system is automatically detected and responsive maintenance CALLs are generated; CRT and keyboard access terminals at each local microcomputer (which is preferably located on the plant floor) so as to permit floor area supervisors and maintenance personnel to request machine data and other reports from the central data processor without leaving the plant floor; and the provision of a complete central data processor unit (which need not be a microcomputer) that is separate from the front end microcomputer and that serves to compile format and permanently record CALL and STATUS data received from the front end microcomputer, issue regular periodic and special request reports, and display current CALL and STATUS data on a CRT terminal.

To provide a complete disclosure of the invention, reference is made to the appended drawings and following description of one particular and currently preferred embodiment.

BRIEF DESCRIPTION OF THE DRAWINGS

FIG. 3 is a more detailed block diagram of a machine microcomputer and the associated operator-controlled input module for entering the CALL and STATUS data into the memory of the machine microcomputer.

FIG. 4 is a block diagram of detail similar to that of FIG. 3 showing the visual display microcomputer and the associated row drivers which responsively energize selected lights on the visual display paging board to visually form the operator-originated CALLs which include the associated machine location.

FIG. 5 is a block diagram of similar detail to that of FIGS. 3 and 4, depicting one of the local microcomputers that is used at an intermediate level in the distributed microcomputer network of FIG. 2.

FIG. 6 is a block diagram showing the serial transmit and receive data paths employed for linking each local microcomputer (FIG. 5) with the associated group of machine microcomputers (FIG. 3) and the associated visual display microcomputer (FIG. 4).

FIG. 7 is a block diagram, of detail similar to that of FIGS. 3 through 5, depicting the front end microcomputer which is situated, along with a central data processor, at the highest level within the distributed computer network shown in FIG. 2.

FIGS. 8A and 8B are flow diagrams of the program governing the operation of the central data processor of FIGS. 1 and 2.

FIGS. 10a and 10B are flow diagrams of the program governing the operation of each of the local microcomputers of FIGS. 1, 2 and 5.

FIGS. 11A, 11B and 11C are flow diagrams of the program governing the operation of each of the machine microcomputers shown in FIGS. 2 and 3.

DESCRIPTION OF THE PREFERRED EMBODIMENT

Figure 1:
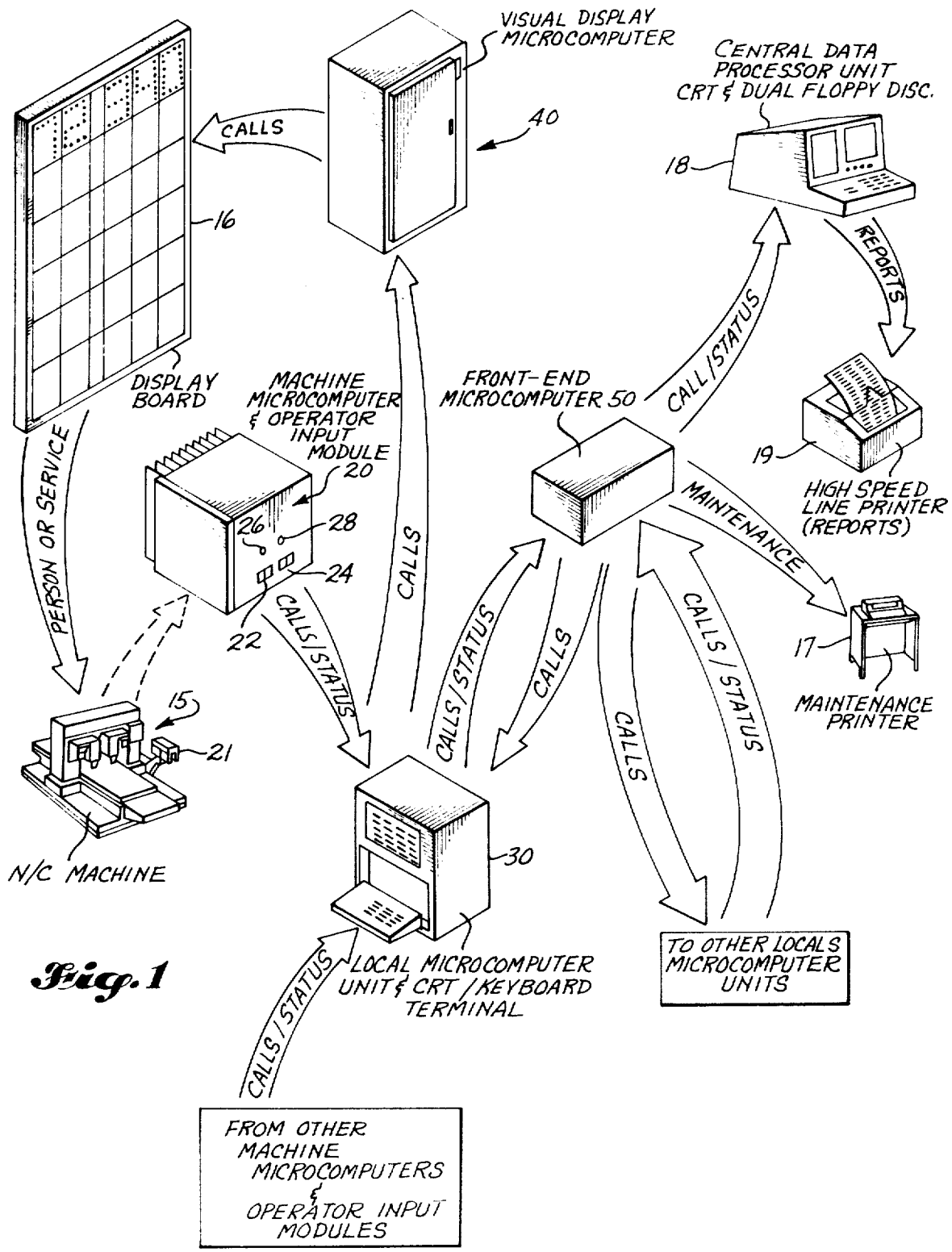
FIG. 1 is a pictorial diagram illustrating one embodiment of the paging, status monitoring and report compiling system of the invention used in conjunction with N/C machines.

With reference to FIG. 1, each of a plurality of N/C machines 15 is linked with a plurality of visual display boards 16 for paging support personnel in the plant area, with a maintenance printer 17 located in the maintenance crib for requesting certain maintenance actions, and with a central data processor unit 18 located in a central control room, by means of a distributed microcomputer network including a plurality of machine microcomputers and operator input modules 20, a plurality of local microcomputer units 30 including associated CRT/keyboard terminals, a plurality of visual display microcomputers 40, and a front end microcomputer 50.

Each of the plurality of N/C machines 15 is provided with a machine microcomputer and operator input module 20 packaged in a common housing 21 and mounted on or adjacent to machine 15 so as to permit an operator, stationed at machine 15 for supervising its operation, to input CALL and STATUS data using a set of CALL selector switches 22 and STATUS selector switches 24. A CALL feedback light 26 and a STATUS feedback light 28 are selectively energized by the microcomputer within module 20 in a manner, as described more fully hereinafter, that assists the operator in entering the CALL and STATUS data using switches 22 and 24. It is noted that module 20 does not contain any of the numerical control circuitry for operating the machine 15, and such control circuitry is not specifically disclosed herein and operates independently of the paging monitoring and report compiling system of the invention.

The total number of machines 15 connected to the system is divided into a plurality of groups. Each group of machines 15 and their associated machine microcomputers and input modules 20 are linked to one of the plurality of local microcomputer units 30. Each such local microcomputer receives and concentrates CALL and STATUS data from the plurality of machine microcomputers and input modules 20 belonging to that group. An associated visual display microcomputer 40 is provided for each machine group for controlling one of the paging boards 16 in response to CALLs held in memory by the corresponding local microcomputer unit 30.

Front end microcomputer 50, serving as the next higher level of the distributed computer system, polls each of the plurality of local microcomputer units 30 to receive and concentrate CALL and STATUS data from all of the machine microcomputers 20. The thusly consolidated data representing CALLs and STATUS are channeled by the front end microcomputer 50 to various parts of the system as follows. CALLs are routed by microcomputer 50 back down the network to the plurality of local microcomputers 30, which in turn distribute the consolidated CALL data to each paging board 16 via the associated visual display microcomputer 40. Thus, paging boards 16 serve to visually page the support personnel at all locations in the plant area where boards 16 are visible. Maintenance CALLs are additionally transmitted to the maintenance crib for printout on the maintenance printer 17. CALLs and STATUS data are also routed by front end microcomputer 50 to the central data processor unit 18 which displays current CALL and STATUS data for each machine on an associated CRT and compiles periodic reports and stores such reports permanently on a floppy disc recording. Additionally, upon request, processor unit 18 acts through high speed line printer 19 to print out previously compiled reports.

Figure 2:
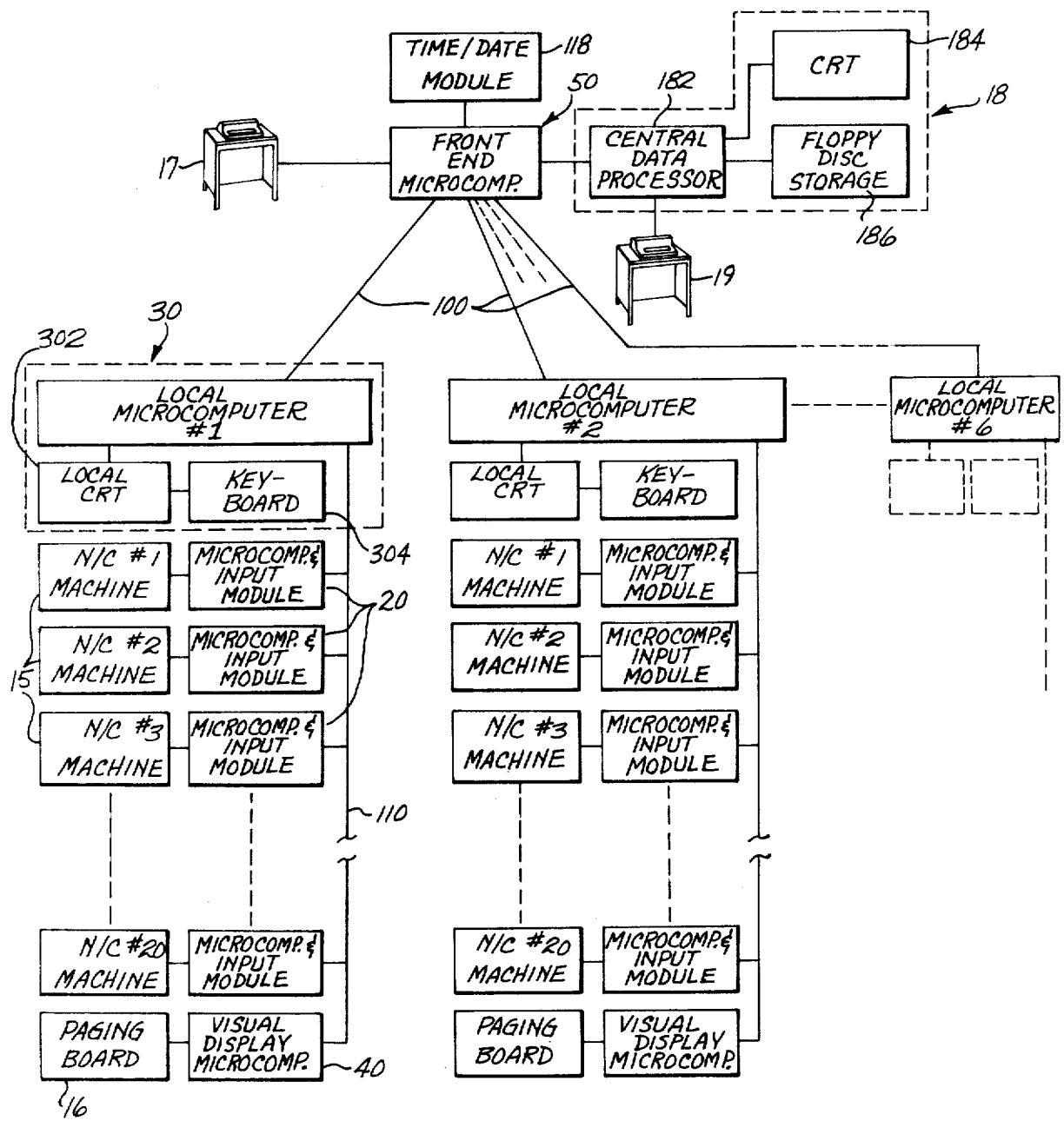
FIG. 2 is a generalized block diagram of the distributed microcomputer network that interconnects the plurality of N/C machines and the various computation, visual display, report compiling and terminal printers that comprise the system.

With reference to FIG. 2, it is seen that front end microcomputer 50 is interconnected by a plurality of separate serial data transfer channels 100 to each of a plurality of local microcomputer units 30. Each unit 30 includes a local microcomputer (designated microcomputers #1-6 corresponding to the six local units that are employed in the herein-disclosed embodiment), a local CRT 302 and a local keyboard 304.

Each local unit 30 is associated with a separate group of N/C machines 15, which group will typically be located in a subsection of the overall plant area. In this instance, each local microcomputer #1-6 handles the CALL and STATUS information originating at 20 N/C machines 15. As mentioned above, each N/C machine is equipped with a machine microcomputer and operator input module 20, which is physically located on or adjacent to the associated machine for enabling the operator to input CALL and STATUS data into the microcomputer network. Thus, under the charge of local microcomputer #1, 20 such machine microcomputers and input modules 20 are provided, one for each of machines #1-20. Modules 20 are coupled to microcomputer #1 by a party line serial data transfer link 110 which, as more fully described hereinafter, greatly reduces the amount of physical wiring required between the various machine mounted modules 20 and the associated local microcomputer.

Additionally, as shown for local microcomputer #1, each local unit is coupled over party line link 110 to one visual display microcomputer 40, which in turn is connected for operating one of the visual display paging boards 16. It is observed that the visual display microcomputer 40 communicates with the local microcomputer #1 over the same party line data link 110 that serves to communicate the machine microcomputers in modules 20 with local microcomputer #1.

Similarly, local microcomputer #2 has its associated CRT and keyboard, and is linked to another group of up to 20 N/C machines and associated machine microcomputer and input modules, and to a visual display microcomputer and associated paging board.

Each local unit 30 and its associated group of machines 15, modules 20, visual display microcomputer 40 and paging board 16 is capable, as described more fully hereinafter, of functioning in a limited capacity as a separate, independent subdivision of the overall system depicted in FIG. 2. In the disclosed embodiment, front end microcomputer 50 is capable of accommodating up to six local units 30, however, it will be appreciated that the computing and memory capacity of microcomputer 50 may be readily extended to handle a larger number of local units.

To correlate the CALL and STATUS data that originates at the operator inputs of modules 20 with the date and time of day (shift time), front end microcomputer 50 receives as an input thereto time and date data from a time/date module 118. Central data processor unit 18 coupled to front end microcomputer 50 includes in addition to the central data processor 182 a CRT 184 and a floppy disc storage 186. Processor 182, CRT 184 and storage 186 may be packaged as an integrated console as depicted by unit 18 in FIG. 1.

The machine microcomputer used in each of modules 20, the local microcomputer used in each local unit 30 and the front end microcomputer 50 may all be provided by identical, commercially available microprocessors, each complemented by various input/output and memory devices. For example, the presently disclosed embodiment uses a single chip, 8-bit word, large scale integrated (LSI) microprocessor as supplied by Intel Corporation of California, as their 8085 microprocessor, together with complementary LSI chips for the input/output (I/O) interface, random access memory (RAM) and eraseable programmable read only memory (EPROM). By using identical microprocessors and where possible, identical complementary I/O, RAM and EPROM devices, a substantial savings is achieved in terms of both the original manufacture of the system, and moreover, in the servicing and maintenance of the system.

Thus, with reference to FIG. 3, each of modules 20 shown in FIGS. 1 and 2 is provided by a machine microcomputer 201 and an associated input control 202. Microcomputer 201 includes a microprocessor 210, a serial I/O device 211, a RAM and parallel I/O device 212, and an EPROM and parallel I/O device 213. Devices 211-213 are linked to the microprocessor 210 by means of common address/data/control bus 214, which is a parallel bit transfer bus. Microprocessor 210 has the capacity of operating up to 256 input and 256 output, eight-bit channels and as mentioned, may be provided by an Intel 8085 integrated microprocessor chip. Serial I/O device 211 is a programmable communication interface, in which parallel bit channels associated with bus 214 can be converted for transmission over a serial transfer channel having transmit and receive loops 216 and 217. Intel's integrated interface chip 8251 may be used for device 211. Loops 216 and 217 are connected as described more fully below to communicate data between each machine microprocessor 210 and the local microcomputer of unit 30.

RAM and parallel I/O device 212 is an LSI composite random access memory and parallel bit input/output device having a 256 bytes memory and two eight-bit I/O ports A and B and one six-bit port C such as provided by Intel's LSI chip 8155.

EPROM and parallel I/O device 213 has a 2K byte (each byte=8-bit word) eraseable, programmable read-only memory, and two eight-bit parallel I/O ports A and B, such as provided by Intel's LSI chip 8755.

Input control 202 includes a series of manually controlled switches and LED indicator lights connected to the parallel I/O ports of devices 212 and 213 of microcomputer 201 for inputting CALL and STATUS data into the RAM memory of microcomputer 201. More particularly, control 202 includes a pair of BCD encoding, manually operated thumb wheel switches $S_1$ and $S_2$ which together form the bank of switches 22 on module 20 (FIG. 1) for introducing a CALL at the machine level. A like pair of switches $S_3$ and $S_4$ form the bank of STATUS switches 24 on module 20 (FIG. 1) for introducing a two digit STATUS code into the machine microcomputer. The two digit CALL code produced by selectively rotating switches $S_1$ and $S_2$ develops a parallel seven-bit CALL signal that is introduced into device 212 of microcomputer 201 via port B. Switches $S_3$ and $S_4$ develop a parallel seven-bit STATUS signal that is introduced into the microcomputer 201 at port A of device 212.

The two remaining bits, one each in port A and port B are used to receive two automatically generated signals including an N/C mode signal source 220 and an N/C override signal source 222. N/C mode signal source 220 is a conventional switching circuit that provides a high or low discrete voltage output, depending upon whether the associated N/C machine is in the N/C mode or in some other mode, such as an operator controlled mode. Similarly, the N/C override signal source 222 is provided by an electrical circuit that is responsive to a conventional, operator adjusted, continuously variable override control provided on each N/C machine. A comparator circuit is employed in signal source 222 for determining whether the operator has set the override control within a predetermined percentage (arbitrarily chosen) of an optimum operating speed for the particular machine. As an example, a suitable value is 80% of the optimum speed. The N/C mode signal and N/C override signal are fed into microcomputer 210 through the spare bit inputs of ports A and B of device 212 and are subsequently processed along with the STATUS data as described hereinafter.

The device 212 also issues two one-bit output signals for the CALL feedback and STATUS feedback lights 26 and 28 which are provided by LEDs connected to two available output bits at port C.

In addition to the operator controlled switches $S_1$-$S_4$ and the feedback indicator lights 26 and 28, the input control 202 for each module 20 includes a set of three BCD encoding, manually operated switches $S_5$-$S_7$ for setting a three digit I.D. number (0-999) for the associated machine. Switches $S_5$-$S_7$ are not readily accessible to the machine operator, and are located inside a removable cover on housing 21 (FIG. 1). Thus during the setup of the system, switches $S_5$-$S_7$ for each machine module 20 can be set to uniquely identify that module and its associated machine, and thereafter these switches will normally remain in their preset positions. Collectively, switches $S_5$-$S_7$ form a parallel twelve-bit output which is connected to one eight-bit port A and half of eight-bit port B of device 213. The selected machine I.D. number is thus inputted into microprocessor 210 of the machine microcomputer 201. This allows 999 unique machine I.D. numbers to be selected.

Microcomputer 201 is programmed, as described more fully hereinafter, to receive data and time data from the time data module 118 (FIG. 2) via front end microcomputer 50 and local microcomputer unit 30 during each start-up of the system, such as at the beginning of the first shift of each day, or the beginning of the first shift of the first work day of the week. This time and date information serves to synchronize a continuously running data clock, programmed into each machine microprocessor 210 to the date and time existing during the start-up sequence. The programmed clock existing within microprocessor 210 is advanced in a continuous fashion by an external 60 hertz clock 230 having an output connected to an interrupt input 232 of microprocessor 210. Clock 230 includes a sixty hertz line voltage source 234 connected through a series resistor R to an input of an optical isolator 236. The output of isolator 236 is connected to the interrupt input 232 of microprocessor 210 as illustrated.

With reference to FIG. 4, the visual display microcomputer 40 includes a microprocessor 410, a serial I/O device 411, a RAM and parallel I/O device 412 and an EPROM and parallel I/O device 413. The devices 411-413 are interconnected with the microprocessor 410 by a parallel address/data control bus 414. Serial I/O device 411 serves to link display microcomputer 40 to the associated local microcomputer. For this purpose, device 411 has a transmit port 416 and a receive port 417 that are coupled, in a manner described more fully herein, to the party line, serial data transfer link 110 referred to above and shown in FIG. 2. EPROM and I/O device 413 serves as the permanent memory for the program, described hereinafter, under which microprocessor 410 operates. RAM and parallel I/O device 412 provides a plurality of parallel bit outputs that are connected to a set of six row drivers 420 that decode the bit outputs from device 412 and in response thereto operate paging display board 16 (FIG. 1).

Board 16 as illustrated in FIGS. 1 and 4 is formed of a set of six rows, each row including a two-digit numeric CALL code (code 72 in the first row of FIG. 1) and a three digit machine I.D. (number 340 in the first row of FIG. 1). Each row of display 16 is provided by a multiplicity of selectively energizable lamps wherein each digit formed by a conventional seven segment array, and each segment is composed of a line of lamps. The lamp segments are selectively energized to form in a composite fashion, decimal digits from zero through nine. The numerical information that is to be displayed on board 16 is decoded by microprocessor 410, operating in accordance with its program as described more fully hereinafter, and the thusly decoded control bits are passed by device 412 to row drivers 420. Each of the six row drivers controls one complete row on display board 16, and for this purpose includes five latch networks, each latch network having the capability of latching all seven of the lamp array segments for each digit.

Each display 16 is also provided with a bank of six manually operated switches $SR_{1-6}$ connected to parallel bit ports on device 413, each for selectively enabling or disabling one of the rows on display 16, so that a plant supervisor can deactivate a row on the board that can no longer faithfully display CALL data because of too many burned out lamps. As described herein, the positions of these switches $SR_1$-$SR_6$ are monitored by the display microcomputer to cause the computer to skip disable rows on board 16 during a display sequence.

As in the case of machine microcomputer 201, the display microprocessor 410 may be provided by an Intel 8085; serial I/O device 411 may be provided by an Intel 8251; device 212 may be provided by an Intel 8155 and device 413 may be provided by an Intel 8755.

With reference to FIG. 5, the microcomputer for each local unit 30 includes a local microprocessor 310, a serial I/O device 311, a RAM 312, an EPROM 313, a second serial I/O device 320 and a third serial I/O device 322. Device 311 serves to convert the parallel address, data and control information in bus 314 into a serial format for communicating with the front end microcomputer 50 over twisted pair current loops, one for each of the transmit and receive channels 316 and 317. As previously mentioned, channels 316 and 317 form a separate, independent serial data path 100 (FIG. 2) linking the front end computer 50 directly to each local microcomputer, independently of the other serial data paths that link the other local microcomputers to the front end microcomputer 50. RAM device 312 serves as the scratch pad memory for the local microcomputer, and EPROM device 313 serves to permanently store the program that governs the operation of microprocessor 310. Serial I/O device 320 provides a conventional interface between the local CRT and keyboard 302 and 304 (FIG. 2).

Serial I/O device 320 serves to convert the parallel address/data and control information on bus 314 to a serial format for communicating with each of the machine microprocessor modules 20 and the display microcomputer 40. For this purpose, and as more fully described below in connection with FIG. 6, device 322 includes transmit and receive channels 324 and 325 that respectively generate and receive serial data transmitted by separate current loops linking each of the machine microcomputers and display microcomputer of the associated group.

Like machine microcomputer 201, the local microprocessor 310 may be provided by an Intel 8085, serial I/O devices 311, 320 and 322 may each be provided by an Intel 8251; and RAM 312 may be provided by an Intel 8155 (in which case the parallel I/O capability of the 8155 is not used); and EPROM device 313 may be provided by an Intel 8755 (also in which case the parallel I/O portion of the device is not used).

In FIG. 6, the party line, serial data transfer link 110 shown in FIG. 2 and referred to above as linking the local microcomputer of unit 30 with each of the associated machine microcomputers 201 and display microcomputer 40. As shown therein, serial I/O device 322, described above in connection with FIG. 5 has a data transmit channel 324 and a receive channel 325. Transmit channel 324 is connected through an optical isolator 330 to a voltage controlled loop current source 332, and hence through a current loop including leads 334 A and B which may be provided by a twisted pair of wires, to a plurality of optical isolators 336 connected in series with leads 334 A and B. Loop current source 332 may be provided by an electronic switching circuit that selectively connects a source of current to leads 334 A and B whenever the transmit channel 324 is high and disconnects the current source from the leads when the transmit channel 324 is low. A separate optical isolator 336 provided for each of the machine microcomputers 201 and for the visual microcomputer 40. Current flowing in the common loop provided by leads 334 A and B is passed serially through each of the light emitting diodes 338 of each coupler 336 so as to selectively turn on the associated photo-transistor 340. Leads 342 A and B from transistor 340 of each optical isolator 336 are connected to the receive channel of the serial I/O device of the associated microcomputer 201, such as serial I/O device 211 of microcomputer 201 in FIG. 3. Similarly, the corresponding output leads from optical isolator 336' are connected to the receive input channel of the serial I/O for the associated display microcomputer 40 such as serial I/O device 411 of microcomputer 40 as shown in FIG. 4. In practice, the twisted pair of leads 334 A and B are routed to and from each of the N/C machine stations over relatively long conduits, such that the twisted pair must extend for a significant distance between each of the optical isolators 336 and 336'.

Similarly, on the receive side of link 110, another twisted pair of leads 340A and 340B form a current loop in conjunction with a loop current source 342 for serially linking each photo-transistor output of another plurality of optical couplers 346 and 346'. A separate isolator 336 is provided again for each of the machine microcomputers 201, and the light emitting diode inputs for each of these couplers is connected to the transmit channel of the associated machine microcomputer 201, such as at the transmit channel 216 of serial I/O device 211 shown in FIG. 3. Similarly, isolator 346' has its diode input connected to the transmit channel of the associated I/O device 411 of the associated display microcomputer 40 as shown in FIG. 4. Again, the twisted pair leads 340A and 340B that link each of the isolators 346 and 346' extend a substantial distance between each such isolator.

The interruption in the current loop caused by the opening of the photo-transistors of isolators 346 and 346' is detected by a digital detector 348, which may be provided by a comparator. The digital output from detector 348 is coupled through an optical isolator 350 to the receive channel 325 of serial I/O device 322.

Optical isolators 330 and 350 eliminate ground current loops and insure that electromagnetic fields and stray voltages due to crossed wires, etc., do not result in the coupling of excessively high voltages into the local microcomputer via I/O device 322. The use of common current loops (e.g., a 20 ma loop current is suitable)

provides a transmit/receive link that is highly immuned to interference from electrical noise.

As described more fully hereinafter, the resulting party line data link 110 requires that any data to be transmitted from the local microcomputer to any one or more of the individual machine microcomputers 201 or display microcomputer 40 be received by all the microcomputers in the same group. Data to be channeled to only certain of the microcomputers via the transmit channel 324, carries with it an identification code that uniquely addresses that particular one of the machine or display microcomputer that is to receive data, and/or respond to a polling request issued by the local microcomputer. Data to be transmitted from one of the machine microcomputers 201 or display microcomputer 40 upwardly in the network to the local microcomputer, requires that only one of the optical isolators 346 and 346' be operated at any given time. This condition is met by programming the various microcomputers as described more fully below, so that machine microcomputers 201 and display microcomputer 40 do not transmit data over twisted pair leads 340A and B until requested to do so by a polling sequence initiated by the local microcomputer and addressed to a particular machine microcomputer 201 or display microcomputer 40 over the transmit current loop formed by twisted pair 334A and B. By constructing the party line link 110 in this manner, machine processors 201 can be readily added or deleted from the local's group. Additionally, less wire need be strung for this transmission link, and only programmed handshaking, not hardware handshaking, is required between the local, machine and display microcomputers.

With reference to FIG. 7, the front end microcomputer 50 is shown to include a front end microprocessor 510 which is augmented by a serial I/O device 511 for interfacing with the central data processing unit 18, a RAM device 512 for providing scratch pad memory, an EPROM and parallel I/O device 513 for permanently storing the memory governing microprocessor 510, and for receiving time and date words from clock module 118, a further serial I/O device 515 for interfacing with the maintenance printer 17, and a bank of additional serial I/O devices 518, one for interfacing with each of local microcomputers #1-6. Devices 511, 512, 513, 515 and 518 are interconnected by address/data/control bus 514.

Front end microcomputer 50, in the presently disclosed embodiment, is mounted for convenience in a cabinet housing one of the local microcomputer units 30, which as mentioned above, are located on the plant floor along with the associated group of N/C machines 15. From this location, front end microcomputer 50 communicates with the central data processing unit 18 over twisted pair leads connected to the transmit and receive channels 516 and 517 at the serial data ports of I/O device 511. Similarly, serial I/O device 515 is linked to maintenance printer 17 over twisted pair leads connected to the transmit and receive channels 520 and 521 at the terminal ports of device 515. Thus, even though front end computer 50 is mounted at a location far removed from the control room where data processing unit 18 is disposed, and far removed from the maintenance crib where printer 17 is located, data communication with these components is facilitated by the use of serial data transfer carried over easily strung twisted pair conductors.

As briefly described above, serial data paths 100 link the front end microcomputer 50 with each of the local microcomputers #1-6 (FIG. 2). For this purpose, each of serial I/O devices 518 form the interface between corresponding transmission paths 100 and the front end microcomputer 50. Thus, I/O device 518 for microcomputer #1 has its transmit and receive serial data ports connected over twisted pair conductors (forming one of serial data paths 100) to the corresponding receive and transmit channels of serial I/O device 311 of local microcomputer #1 of the first local unit 30 (FIG. 5). The remaining serial I/O devices 518 are similarly connected over twisted pair conductors to the receive and transmit channels of the I/O device, corresponding to device 311, for each of the other microcomputers #2-6.

Serial I/O devices 511, 515, and 518 may be provided by the abovedescribed Intel LSI chip 8251. RAM device 512 may be provided by an Intel LSI chip 8155, in which case the parallel I/O capability of the Intel 8155 is not used. EPROM and parallel I/O device 513 may be provided by an Intel LSI chip 8755.

Operation of Central Data Processor Unit 18

As more fully characterized in the program flow chart described below in connection with FIGS. 8A and 8B, processor 18 functions at the highest level of the computer network to perform the following:

(1) receive CALL and STATUS data from the front end microcomputer and permanently store such data on a floppy disc, available for subsequent recall;

(2) receive via the front end microcomputer 50 requests, entered on the keyboard terminal of any one of the local microcomputer units 30 (located on the plant floor) for reports on the performance of any one or more of the N/C machines, gather the necessary data for completing the report, format the report and transmit it through the front end microcomputer 50 to the CRT of the local unit 30 that initiated the request;

(3) download the system parameters (for configuring the various microcomputers into a functional system) to the front end microcomputer 50, to the local microcomputers #1-6 of local units 30, to the machine microcomputers 201 of modules 20, and to the display microcomputers 40 (in the present embodiment the system parameters include shift times - 1st, 2nd and 3rd; report formats and times for printing regular reports; all active machine I.D. #s and machine descriptions; diagnostic data; break times and all legal CALL and STATUS codes);

(4) synchronize the internal time and date memories of the machine microcomputers 201 and local microcomputers #1-6 to the time and date available from time/date module 118 connected to front end microcomputer 50;

(5) automatically compile and printout daily and weekly management reports on printer 19;

(6) cause current CALL and STATUS data to be visually presented on CRT display 184.

Figure 8A:
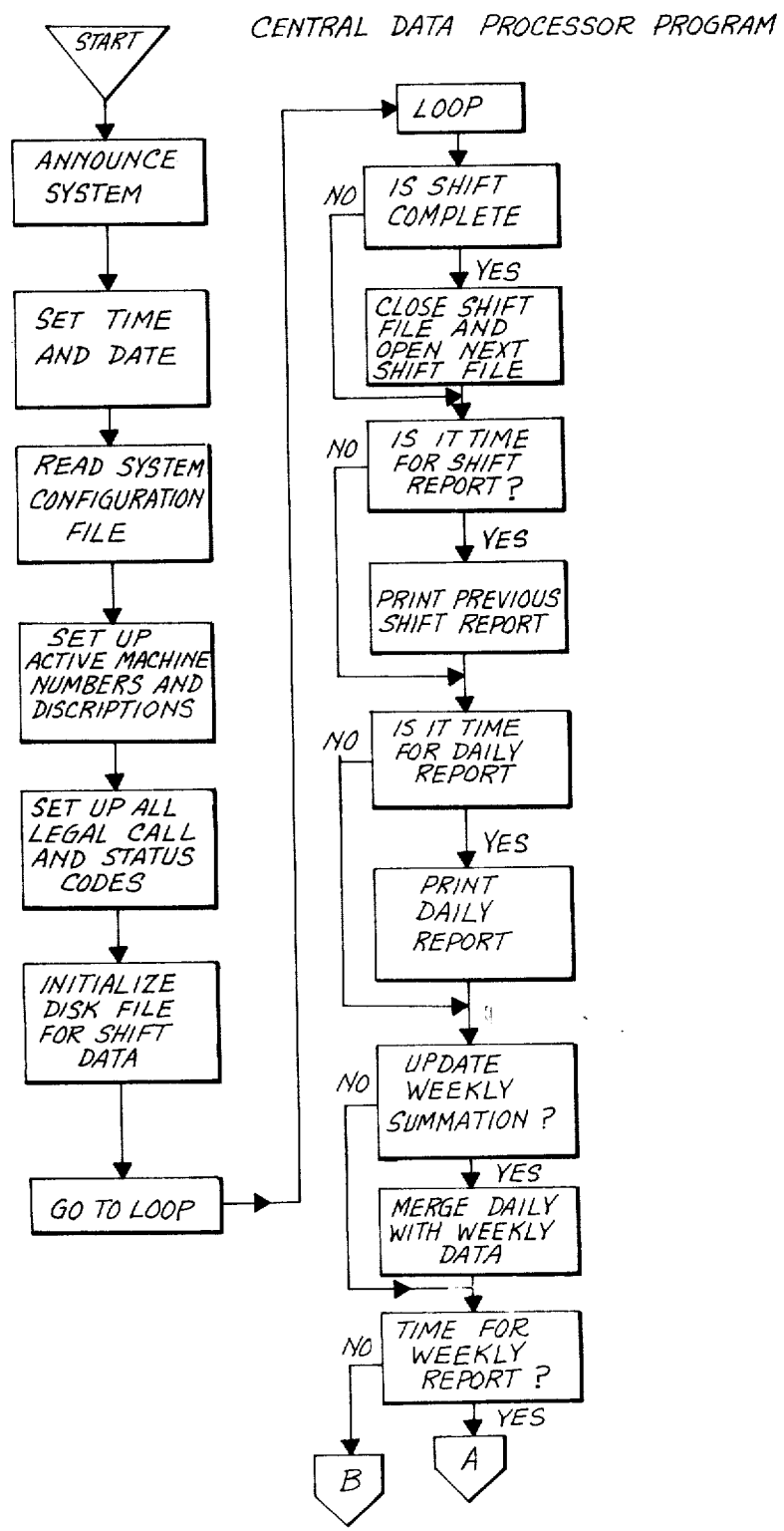

To carry out the above-summarized functions of data processor 118, it is programmed in accordance with the flow chart set forth in FIGS. 8A and 8B. While it is believed that the foregoing description of the components and functions of the system will enable those skilled in the art to readily program the general purpose data processor 18, the flow charts set forth in FIGS. 8a and 8B provide a complete disclosure of the particular and preferred manner of operation of processor 18. Thus with reference to FIG. 8A, following the program startup, the system is initialized by announcing that the system is running; setting the time and date in the front end microcomputer 50 according to module 118 and downloading the time and date into each of the local microcomputers and machine microcomputers; reading the system configuration file on the number and group location of the N/C machines; setting up active machine numbers and descriptions; setting up legal CALL and STATUS codes; and, initializing the floppy disc file for shift data.

Having initialized the system, the central data processor is ready to go to the main processing loop. Starting at the beginning of the loop, the data processor determines whether the shift is complete, and if the answer is yes, then it closes the shift file and opens the next shift file. If the answer is no, the data processor jumps the latter instruction.

Next, the data processor determines whether it is time for a shift report and if yes the previous shift report is printed. If no, the print instruction is jumped.

Then, it determines whether it is time for a daily report, and if yes such daily report is printed, and if no, the latter instruction is skipped.

Next, the data processor determines whether an update of a weekly summation is needed, and if yes the update daily data is merged with the weekly data and if no there is a skip to the next instruction.

The next instruction determines whether it is time for a weekly report and if yes the weekly report is printed (continued on FIG. 8B), and if no the latter step is skipped.

Having completed the report compiling and printing section of the program, data processor 18 then asks if there is a CRT input to determine whether a request has been made for displaying data on the CRT terminal of the data processor. If yes, the data processor enters a subroutine controlling the CRT display including decisions on whether the entry is authorized by looking for the proper sign on and processing the level of access, determining whether the sign is off and if yes turning off the access to the computer and skipping the rest of the subroutine.

Next it is determined whether the user is requesting a report and if yes the requested machine CALL and STATUS data is displayed on the processor CRT, and if no, the data processor advances in the subroutine. Next it determines whether a parameter update has been requested and if yes the update of the system parameter is entered on the keyboard of processor 18. If no, the subroutine determines whether the user wants to terminate the running of the system and if yes all files are closed and the CRT is placed in a monitor mode. If no, the program alerts the user to an error in the entry of the request, inasmuch as all of the possible requests have been considered and answered in the negative.

This completes the CRT subroutine and marks the beginning of a new subroutine during which processor 18 communicates with the front end microcomputer 50. This routine begins with a request for an input from the front end microcomputer. Having made the request, data processor 18 determines whether data is ready to be transmitted from the front end microcomputer. If no, there is a jump to the end of the subroutine and a return to the main loop. If yes, the data processor receives the data from the front end microcomputer and then determines the type of data. CALL and STATUS type data are stored on the floppy disc.

Having completed part of the front end microcomputer subroutine, data processor 18 then asks whether there has been a request by the front end microcomputer to transmit the system parameters. If no, the rest of the subroutine is jumped and there is a return to the main loop. If yes, processor 18 transmits the system parameters to the front end microcomputer, and then asks for an acknowledgement that the front end microcomputer received the system parameters. That ends the front end microcomputer subroutine and the processor now returns to the main loop beginning on the upper right hand side of FIG. 8A.

Operation of Front End Microcomputer

In summary, front end microcomputer 50 carries out the following chores:

(1) sequentially polls each local microcomputer and requests transmission of current CALLs and STATUS data;

(2) relays operator assistance CALLs concentrated in one local microcomputer to all other local microcomputers for being presented on their associated paging display boards 16;

(3) identifies and routes maintenance CALLs to maintenance printer 17 located in the maintenance crib;

(4) routes all CALLs and STATUS data to the central data processor 18 for storage on the floppy disc storage as described above under the operation of processor 18;

(5) routes requests for reports from a requesting local microcomputer unit 30 to the central data processor 18 for execution;

(6) routes reports from central data processor 18 to the local unit that requested the report or reports;

(7) reads the time and date words from the time/date module 118 and updates the time and date in processor 18 and synchronizes the internally programmed clocks within each local microcomputer to the time data from module 118;

(8) determines whether a local microcomputer has failed to respond to polling and if so generates maintenance CALL and transmits such CALL to maintenance printer 17.

Figure 9A:
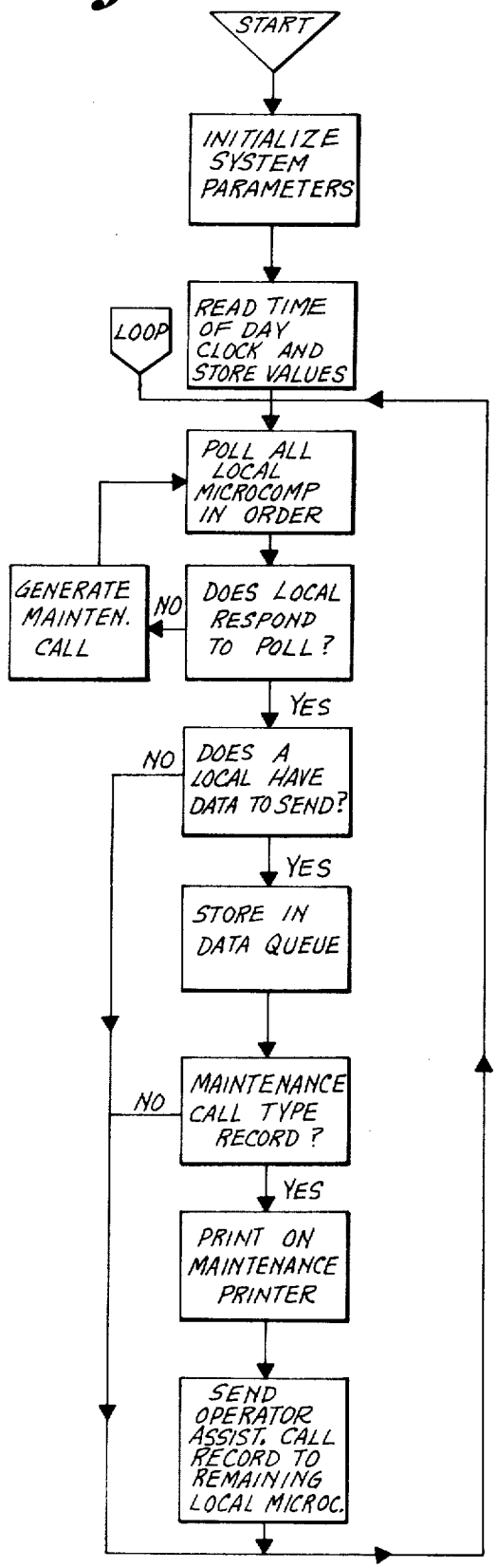
FIGS. 9A and 9B are flow diagrams of the program governing the operation of the front end microcomputer of FIGS. 1 and 2.
Figure 9B:
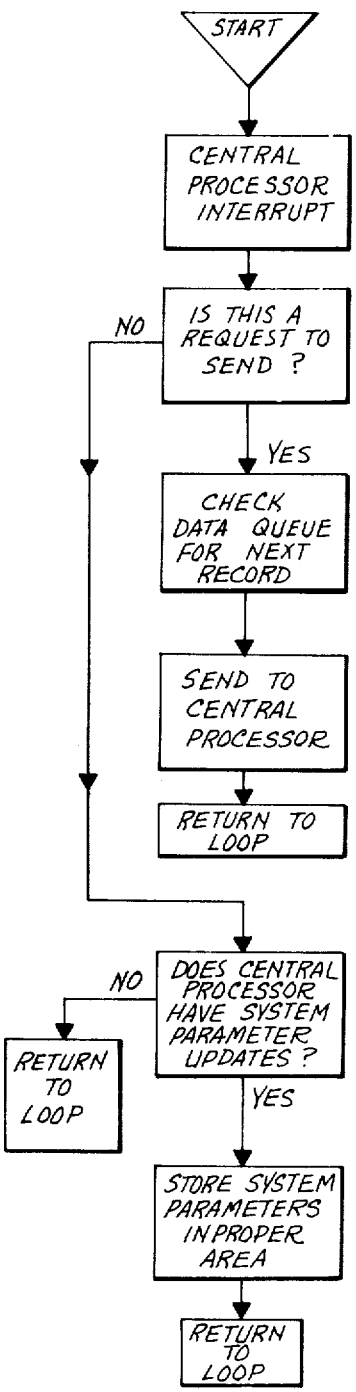

While as described above in the case of central data processor 18, it is believed that the programming of front end microcomputer 50 will be apparent from the foregoing overall description of the system and the above-stated chores of the front end microcomputer, there is set forth in FIGS. 9A and 9B a functional flow chart of a suitable program for this purpose. The program for the front end microcomputer 50 is permanently stored in the EPROM 513 (FIG. 7) for controlling the front end microprocessor 510. It will be appreciated, however, that in accordance with the known characteristics of an EPROM device, the EPROM memory can be erased and changed to update the microcomputer program as required.

Thus with reference to FIG. 9A, following the start of the front end microcomputer program, the program initializes the system parameters and then reads the time and date words from time/date module 118 and stores the corresponding values.

The microcomputer is now initialized and is disposed at the beginning of a loop that interrogates each of the local microcomputers and processes CALL and STATUS data. In particular, the first step is to poll all local microcomputers in sequence. As each local microcomputer is addressed, the front end microcomputer determines whether each active local microcomputer answers the poll. If not, a maintenance call is generated and the loop returns to the sequential polling block. If the local answers, the front end program asks whether the local has data to send. If none of the locals have data to send, the program returns to the beginning of the loop. If any one or more of the locals have data to send, that CALL and STATUS data is stored and the data queue (area of microcomputer memory reserved for such data). The program then inquires whether the data is a maintenance CALL type record. If yes, the maintenance CALL data is printed on the maintenance printer 17. If no, operator assistance CALL data is sent to the remaining local microcomputers for being passed on down to the associated display microcomputers 40 for being presented on the associated display board 16.

At any time during the main front end program loop depicted in FIG. 9A, microprocessor 510 of the front end microcomputer 50 (FIG. 7) may receive an interrupt command from the central data processor 18. Such interrupt, as depicted in the flow chart of FIG. 9B, initiates a series of actions by the front end microcomputer during which the front end microcomputer communicates with the central data processor 18. Thus in FIG. 9B, in response to a central processor interrupt, the front end microcomputer determines whether it has been requested to send data. If yes, the front end microcomputer checks its data queue for the next record and sends that record to the central data processor and thereafter returns to the main loop shown in FIG. 9A.

If in the foregoing interrupt routine, there is a no to the question of whether the front end microcomputer is to send data, then the interrupt program skips to a subdivision of the interrupt routine and asks whether the central processor has system parameter updates. If no, the program returns to the main loop in FIG. 9A, ending the interrupt. If yes, the updated system parameters are stored in the proper area of the front end microcomputer memory, and then there is a return to the main loop in FIG. 9A.

The interrupt operation of the front end microcomputer can occur at any time, and does not need to wait until the main loop shown in FIG. 9A has been completed. Immediately in response to an interrupt command from the central data processor, the front end microcomputer shifts to the interrupt routine and completes that routine until instructed to return to the main loop. When such a return instruction occurs in the interrupt routine, the front end microcomputer shifts back and continues from whatever point it left off in the main loop depicted in FIG. 9A.

Operation of the Local Microcomputer

In summary, each of the six local microcomputers #1-6 functions to:

(1) sequentially poll each of the machine microcomputers 201 and request them to transmit CALL and STATUS data;

(2) route operator assistance CALLs generated within the local microcomputer to the visual display microcomputer 40 of the associated group;

(3) route all CALL and STATUS data to the front end microcomputer 50 for further processing as described above;

(4) receive operator assistance CALLs from the front end microcomputer 50 and route such CALLs to the associated display microcomputer 40. (It is observed that step 2 causes only the CALL data generated within the local to be channeled to the associated display microcomputer, whereas step 4 causes all of the assistance CALL data from all of the local groups, including the originating group, to be transmitted to each display microcomputer 40);

(5) communicate with the local CRT 302 and the local keyboard 304 of the associated local unit 30, determine requests entered via keyboard 304 and forward requests to the front end microcomputer 50 for processing as described above;

(6) receive reports from the front end microcomputer 50 and then send such reports to the associated local CRT 302 for display;

(7) determine whether a machine microcomputer has failed to respond to polling and if so generate a maintenance CALL and transmit such CALL to the maintenance crib.

Again, as in the case of the central data processor, the programming of each local microcomputer will be apparent to those skilled in the art from the foregoing overall description of the system and the above-stated particular chores of the local microcomputer. However, to assist in such programming, a functional flow chart of a suitable program for the local microcomputer is set forth in FIGS. 10A and 10B. In FIG. 10A, the initial routine starts at A and provides for the initialization of the system parameter area of the local microcomputer memory. After completing such initialization, the local microcomputer waits for an interrupt from the front end microcomputer 50.

Upon receiving an interrupt entry from the front end microcomputer, a routine starting at B is initiated. In response to such an interrupt from the front end microcomputer, it is determined whether the local microcomputer is being rebooted with the system parameters. If yes, the local requests the system parameters from the front end microcomputer, and thereafter commences a polling routine beginning at C as shown in FIG. 10B. If the local is not being rebooted, the program skips the request for system parameters and goes to a decision block in which the local asks whether the front end microcomputer is ready to receive data. If the answer is no, this means that the local has not yet received a complete set of the system parameters, and the program goes to a series of instructions in which the local microcomputer determines that the front end has the needed system parameters, and then stores such system parameters in the local microcomputer memory, after which, the program returns to the polling loop C shown in FIG. 10B.

If at the above decision point there is a yes answer to the question of whether the front end is ready to receive data, then the local program goes to a series of instructions in which the local determines whether it has any CALL or STATUS records to send up the network to the front end microcomputer. In particular, the first of these instructions includes a check of the data queue for CALL and STATUS records. Then it asks whether there are any records to send. If no, the local microcomputer returns to polling loop C in FIG. 10B. If yes, the available CALL and STATUS records are transmitted to the front end microcomputer, and then the local returns to polling loop C of FIG. 10B.

Now with reference to the polling loop depicted in FIG. 10B, following start C, the polling sequence begins in which each of the group machine microcomputers is checked in a predetermined address order. First, the local microcomputer determines whether each active machine microcomputer 201 answers the poll. If not, a maintenance CALL is generated and transmitted via the front end microcomputer 50 to the maintenance printer 17. If the machine microcomputer answers, the local asks it whether a block of CALL and STATUS data is ready to send. If no, the loop returns to the above step in which the same question is asked of the next addressable machine microcomputer. If at any machine microcomputer a data block is ready, then loop C of the program causes that data block to be received by the local microcomputer and stored in its memory queue reserved for that data.

Then, loop C continues with a determination of whether the record is an operator assistance CALL and if yes, the CALL is transmitted to the associated display microcomputer 40, and if not, the program jumps to the next decision point.

At that point, it is determined whether a CRT request is pending at the associated local. If no, the polling loop moves to a routine for causing each machine microcomputer of the group to be booted up with the system parameters. In particular, that subroutine first determines whether the machine microcomputer is requesting system data. If yes, the system data is transmitted from the local microcomputer to the machine microcomputer. If no, the latter instruction is skipped and the program returns to start C of the polling loop and the polling continues as above.

If previously it was determined that a CRT request was pending, then the polling loop in FIG. 10B goes to a routine in which the CRT request is processed by first determining whether the appropriate sign on, indicating authorized access, has been keyed into the local keyboard. If yes, the local microcomputer authorizes the access by setting a system access switch and then returning to the start of the polling loop. On a subsequent pass through the polling loop of FIG. 10B, if the entered sign has not been turned off, then the routine determines whether a report has been requested and if yes, and if the system access switch is on, then the requested report is displayed on the CRT. If the access switch is not on, then an error is displayed on the CRT and the program returns to the start of the polling loop at C. When during a subsequent pass through the polling loop routine the local microcomputer determines that the sign is off, then it causes the access switch to be turned off and then returns to start C.

Operation of Machine Microcomputer and Operator Input Module

In general, each machine microcomputer 201 as shown in FIG. 3, is disposed at the lowest level of the distributed computer network for receiving CALL and STATUS input data from the associated control 202. The bit conditions of switches $S_1$-$S_7$ and N/C mode switch 220 and N/C override switch 222 are sequentially and repetitvely scanned to determine the collective bit conditions of these switches and the results of the scanning operation are temporarily stored in the RAM memory of microcomputer 201 until such data is passed upwardly in the network to the associated local microcomputer. More particularly, each machine microcomputer functions to:

(1) periodically scan the settings of the various input switches of control 202 and respond to any changes in such switch settings by storing the new word value in the microcomputer RAM along with the real time at which the change occurred, thus reading the CALL codes and STATUS codes entered by the operator. (While the particular code requirements will vary from installation to installation, CALL codes are used in the present embodiment to page for: supervisors, shop area men, relief operators, tool kitters, and chip tub men and maintenance CALL codes for various electrical and mechanical maintenance jobs; and STATUS codes are used for the following machine conditions: setup, part handling, various delay subcategories, unassigned, down for maintenance, normal N/C mode, and N/C override mode);

(2) respond to a polling interrupt from the associated local microcomputer and pass upwardly in the network to the local microcomputer any updating of the CALL and STATUS data caused by changes in the switch settings on control 202, together with the real times at which changes in such data have occurred;

(3) illuminate the LED indicator lights 26 and 28 on module 20 to feed back an acknowledgement to the operator that CALL and STATUS codes set on the module switches $S_1$-$S_4$ (22 and 26 in FIG. 1) have been read and stored in the machine microcomputer memory;

(4) determine the N/C mode switch 220 and N/C override switch 222 whether the N/C machine 15 is in an automatic numerical control mode or not, and whether the operator has set the feed rate setting within an acceptable set point (percentage) of an optimum machine speed (not in override mode) or whether the machine speed has been set below the set point (thus in the override mode). N/C mode and override data is passed along with the CALL and STATUS data upwardly in the network to the local microcomputer;

(5) read the machine I.D. number set by switches $S_5$-$S_7$ on input control 202.

While as stated above in connection with the programming of the central data processor, front end and local microcomputers, it is believed that the programming of the machine microcomputer will be apparent to those skilled in the art from the foregoing description of the overall system and the list of specific chores for the machine microcomputer listed immediately above. However, for assisting in such programming, a functional flow chart of a suitable program for each machine microcomputer is shown in FIGS. 11A, 11B and 11C and is described below.

In the presently disclosed embodiment, the machine microcomputer program is permanently stored in the EPROM device 312 of microcomputer 201 for controlling the operation of microprocessor 210.

Thus with reference to the drawings, FIG. 11A shows an initialization routine of the machine microcomputer program; FIG. 11B depicts an interrupt routine during which the local microcomputer interrupts the machine microcomputer and polls it for CALL and STATUS data; and FIG. 11C shows a polling routine during which the machine microcomputer sequentially scans the various switch conditions of input control 202 (FIG. 3).

More particularly as shown in FIG. 11A, the machine microcomputer program starts initially at A whereupon the system area in the microcomputer program is initialized. Following such initialization, the machine microcomputer stops and waits for an interrupt from the local microcomputer.

The program then jumps to start B in FIG. 11B and in response to the local interrupt, the interrupt loop is commenced by inquiring whether the machine microcomputer is being rebooted. If yes, the machine microcomputer requests the system parameters from the local microcomputer and following that, the program jumps to the polling loop starting at C and shown in FIG. 11C.

If a no is received in response to whether the machine microcomputer is being rebooted, then the routine jumps to a decision block in which it is determined whether the local microcomputer is ready to receive data. If the answer is yes, the loop proceeds to check the data queue in the machine microcomputer for record entries to be sent and determines whether any records are ready to be sent. If the answer is yes, then the data records in the RAM of the machine microcomputer are transmitted upwardly to the local microcomputer, and the program returns to start C of the polling loop shown in FIG. 11C.

If a no answer is obtained at the prior decision block in which the local microcomputer is asked whether it is ready to receive data, then the only possibility for the interrupt is for updating the system parameters in the machine microcomputer, and accordingly the interrupt routine proceeds to a set of instructions stating that the local has the system parameters and instructing the machine microcomputer to update its system parameters in accordance therewith. Following the execution of the update, the interrupt routine returns to the pooling loop C of FIG. 11C.

Now with reference to FIG. 11C, the polling loop shown therein is entered either by reaching start C polling in FIG. 11B of the interrupt routine, or by reaching any of the return to polling loop C instructions in the interrupt routine. If a machine microcomputer is interrupted by the associated local microcomputer during the middle of the polling loop shown in FIG. 11C, then as soon as the interrupt routine in FIG. 11B has been completed by reaching one of the return to polling loop C instructions, then the polling routine is resumed where it left off at the time of the interrupt.

Accordingly, as shown in FIG. 11C, at start C, the polling of the module input switches begins. First the STATUS switches $S_3$ and $S_4$ are checked. It is then determined whether an ENTER STATUS code is legal and if not the status feedback light 28 is caused to blink and the program returns to the check status switch instruction. If the status code is legal, then feedback light 28 is energized in a steady mode to inform the operator that the entered status code has been received and is a legal code. Momentarily, the energized STATUS light 28 is timed out.

Next, it is determined whether the STATUS code is the same as the previously entered code and if not, the newly entered STATUS code is stored along with the time at which the previous STATUS code ended and the record for the previous STATUS code is designated complete and if room in the memory queue, then the new STATUS code, together with the start time, is stored. Normally, there will be adequate room in the memory queue for receiving all new STATUS data inasmuch as the memory is continually being purged whenever the local microcomputer polls each of the machine microcomputers and transfers STATUS data upwardly in the network to the local microcomputer memory, and hence from there into the front end microcomputer memory for passing to the permanent floppy disc storage of central data processor 18. If, however, for any reason the memory queue for STATUS data in the machine microcomputer runs out of capacity, then a no answer is received at the decision point and the no answer causes an error to be flagged and the routine skips to check the CALL switches.

If at the beginning of the above subroutine, it was determined that the checked status code is the same as the previously entered code, then the polling routine jumps down to perform a similar series of instructions on the CALL input switches. The CALL code inputs are processed in generally the same manner as the STATUS code inputs, except as follows. In the case of a CALL code, it is necessary that the operator be permitted to enter two or more CALL codes for concurrent display on the paging boards. For this purpose, if in the program it is determined that a new CALL code has been entered (in which case a no output is received), then the routine jumps to the upper right hand side of FIG. 11C and asks whether the CALL code is to be cancelled. This decision depends in part upon additional information supplied by the operator. If a CALL code is to be cancelled, the operator enters the CALL code on the CALL code switches $S_1$ and $S_2$ (FIG. 3) and then changes these switches to a predetermined cancel code, such as 00. The program recognizes the 00 as an instruction to cancel the previously entered legal code and does so, storing the end time for the cancelled CALL code and indicating that the CALL record is now ready to be transmitted to the local, when requested to do so.

If the newly entered code is not to be cancelled, then the routine stores the new CALL code and the start time for that code. Accordingly, it is noted that the entering of a new STATUS code causes an automatic cancellation of the previous STATUS code, whereas a new CALL code can be entered while retaining in memory one or more additional and previously-entered CALL codes. This completes the polling of the STATUS and CALL code switches.

The polling routine now continues by checking the N/C mode switch 220 (FIG. 3). If it is turned on, and was previously on, then the routine jumps down to check the feedrate overdrive switch 222. If the N/C mode switch is off, then the program determines whether it was on before, and if yes, then the end time for the N/C mode switch is recorded and the record is set as complete. If the N/C mode switch was not on before, the balance of the routine is skipped and the program goes to return to polling C. If the N/C switch was turned on, and a no answer is received to the question of whether it was on before, then the microcomputer is instructed to store the start time of the on/mode switch 220.

Now the feedrate N/C override switch is checked. If not on and not on before, then the rest of the routine is skipped and the program goes to return to polling C. If the override switch is not on, but was on before, then the program stores the end time for the override mode and sets the record complete and returns to polling C. If the override switch is on, but was not on before, then the program stores the start time for the override switch and returns to polling C, where, upon the polling routine, starts a new cycle at start C. To prevent accumulation of override on time when the machine is not in an automatic N/C mode, the condition of the override switch is read by the microcomputer only when the N/C mode switch is on.

Operation of Display Microcomputer

As described above, a separate visual display microcomputer 40 is provided for each group of machine microcomputers and their associated local microcomputer. Thus six such display microcomputers 40 and accompanying paging boards 16 are provided in the disclosed system. Each display microcomputer 40 provides the following functions:

(1) communicates with the local microcomputer and determines what operator assistance CALLs if any are active and should be displayed;

(2) automatically, sequentially causes all active CALLs to be displayed on the paging display board 16;

(3) if the number of active CALLs exceeds the capacity of board 16 (limited in the present embodiment to six rows), microcomputer 40 will automatically start scrolling the display so as to present all of the active calls on a time share basis;

(4) monitors the conditions of row disable switches $S_4$ #1-6 and determines whether any row has been turned off by the associated disable switch, and if so causes that row to be skipped when displaying the active calls on board 16. This feature is provided to assist in maintenance.

Figure 12A:
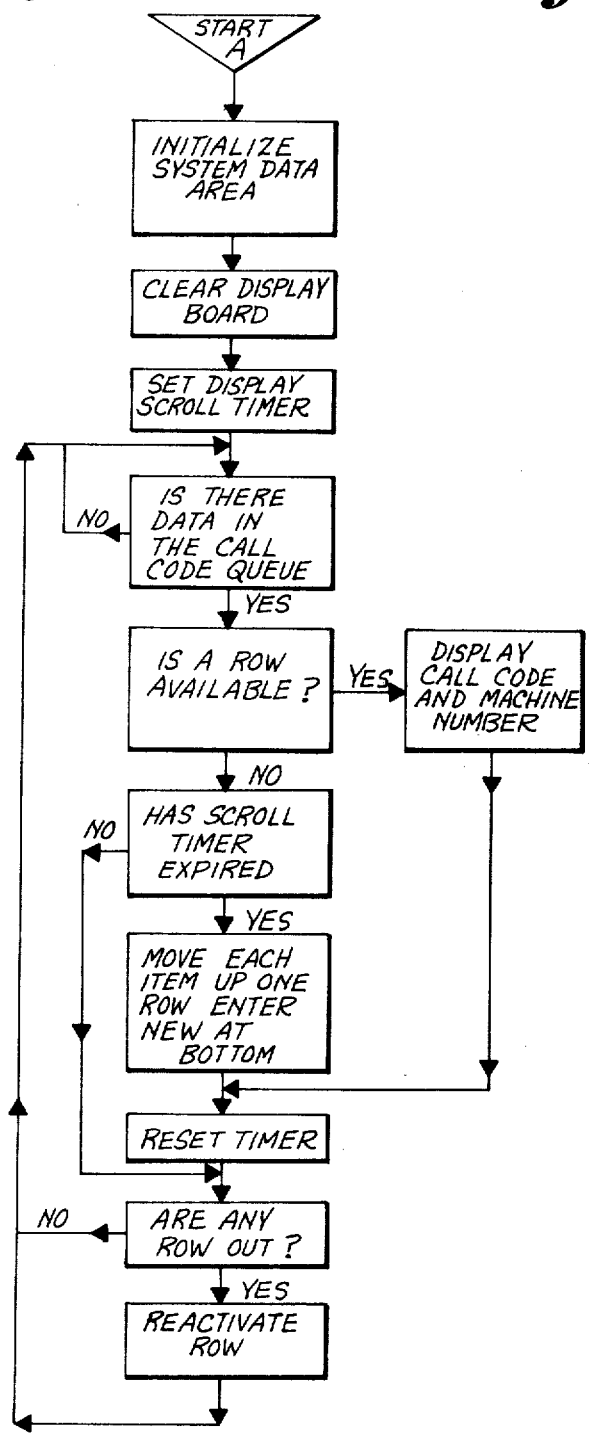
FIGS. 12A and 12B are flow diagrams of the program governing the operation of each of the visual display microcomputers shown in FIGS. 1, 2 and 4.
Figure 12B:
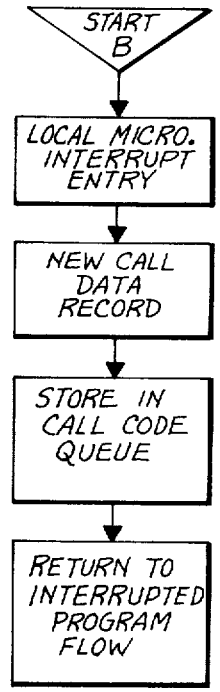

While the programming of display microcomputer 40 will be apparent from the foregoing overall description of the system and the above summarized particular functions of the display microcomputer, a functional flow chart of a suitable program for microcomputer 40 is set forth in FIGS. 12A and 12B. A program according to the flow chart in FIGS. 12A and 12B is permanently stored in the EPROM 413 of microcomputer 40 for controlling the operation of microprocessor 410 (FIG. 4).

Thus, with reference to FIG. 12A, the display microcomputer program commences at start A, and first initializes the system data area of the microcomputer memory. Thereafter, the paging display board 16 is cleared by resetting the latches in lamp row drivers 420 (FIG. 4) and the scroll timer is set to a preselected scroll time (the purpose of which is described below).

The display microcomputer is now ready to cause CALL data to be presented on board 16, and pursuant thereto the program asks if there is data in the CALL code queue. If not, the program simply returns to the prior location and repeats the inquiry until a CALL code is available in the queue. When the latter occurs, a yes answer is obtained and the program advances to a decision point in which it asks whether an empty row is available on the display board 16. If yes, that row is activated, via the associated one of row drivers 420 (FIG. 4) to display the two digit CALL code and the three digit machine I.D. number of the machine at which the call was placed. So long as an empty row is available on display 16, new CALLs are transferred from the CALL code queue to an empty row of the display. When the display board has reached capacity, and an additional CALL is placed in the CALL code queue, then the decision block asking whether a row is available produces a no answer. In such case, the program enters the scrolling mode and first determines whether the scroll timer has expired. If it has, each of the previously displayed CALLs is moved up one row on board 16 and the new code is entered at the bottom. The code previously displayed at the top row of board 16 has now been temporarily removed from the paging board, although it is still held in the CALL queue memory of the display microcomputer. The scroll timer is now reset. On the next pass through of the routine, the removed CALL will be reentered at the bottom row of the display and the top CALL will be temporarily taken off and the intervening CALLs each moved up one row. If during this scrolling mode, it is determined that the scroll timer has not expired, then the program skips the remaining scroll executions and continues with the routine. Eventually, the scroll timer will have expired during an execution of the routine and a yes decision will cause the display to be scrolled up one row as described above.

Following the scroll section of the routine, the program determines whether any row of the display has been turned off by one of the row disable switches $SR_{1-6}$. If so, that row is deactivated so that it is no longer indicated as being available in the memory of the microcomputer and will be skipped when executing the foregoing display routine.

At any time during the main display executing loop shown in FIG. 12A, display microcomputer 40 can be interrupted by a command from the local microcomputer. The resulting interrupt routine is shown in FIG. 12C and commences at start B with a local microcomputer interrupt entry. The interrupt is for the purpose of providing the display microcomputer with a new CALL data record. The new CALL data record is stored in the CALL code queue and thereafter the interrupt routine returns to the main display loop of FIG. 12A.

System Operation

Accordingly, it will be seen that the disclosed embodiment of the invention provides for not only effective communication between the machine operators and the various support personnel available on the plant floor and in the maintenance crib, but also develops current and accurate information on the operating status of a large number of sophisticated machines, such information being necessary to enable management to make the proper decisions and take the necessary actions that will improve the efficiency and productivity of the plant.

Moreover, the unique manner in which the distributed microcomputer network has been integrated with the operator controlled imput modules 20, paging display boards 16, and the CRT, keyboard and printer terminals provides several significant, but not readily apparent, advantages. First, by distributing the computation functions of the system among a plurality of separate microcomputers, and arranging the computers at various levels of a hierarchy network, the overall system is exceedingly tolerant to infrequent, but inevitable breakdowns of one or more components of the overall system. More specifically, the system has been uniquely designed so that failure of certain components of the system will not cause the entire system to shut down, but rather the system will continue to operate in a limited, but nevertheless effective, mode until the overall system can be restored to normal functioning.

To appreciate this failure tolerance characteristic of the system, consider the following failure conditions. If the central data processor 18 shuts down for any reason, such as because it is unable to poll the front end microcomputer 50, then with reference to FIG. 2, it will be observed that the operator assistance CALL codes (which require the most immediate attention) are still channeled via the front end microcomputer 50 to each of the local microcomputers #1-6 and their associated paging boards 16; also maintenance CALLs are still transmitted to the maintenance printer 17 in the maintenance crib. Although in such case, STATUS data accummulated by the front end microcomputer 50 may overflow, causing loss of some STATUS data, because of the inability of the microcomputer 50 to purge its memory banks by passing such data on to the central data processor 18, nevertheless the immediate needs of the machine operators will be met so that the plant can continue running at a high level of productivity.

Now assume that a failure occurs in the front end microcomputer 50. When this occurs, each of the local microcomputers #1-6 of local units 30 will continue to collect operator assistance CALL data from the associated input modules, and cause that data to be displayed on the paging board 16 associated with that local. Thus at least one paging board 16 displays the entered CALL code. It is noted that in this case, those paging boards 16 and associated display microcomputers 40 not connected to the local group at which the CALL originated will not receive the CALL data for display, because the data link through the front end microcomputer 50 has been interrupted.

If one of the local microcomputers fails, that branch of the system simply drops out, but does so in a manner that allows the remaining local microcomputers and their associated group of machines to continue functioning in a normal manner with the front end microcomputer 50. Similarly, if one of the machine microcomputers 201 in any one of the local branches fails, that microcomputer will not disrupt the operation of the remaining machine microcomputers and their cooperation with the associated local microcomputer.

Another advantage of the distributed microcomputer system as disclosed herein is its ability to transmit data between the widely spaced machines, paging display boards, maintenance crib and central control room using easily installed twisted pair conductors. This ability to communicate data in a serial fashion between each of the data concentration points of the system, is a highly important practical advantage, particularly where the system is retrofitted in an existing industrial plant where in many cases it is uneconomical, and sometimes impossible, to string additional large multiwire cabling to and from the operator stations of the industrial machines.

Still another significant advantage of the system is its flexibility. Each group of machines can be added to or subtracted from without disturbing the operation of the overall system, and additional local microcomputers and associated groups of machines and machine microcomputers can be added to the system relatively easily. Furthermore, if for some reason there is a reduction in the need for the total plant capacity, one or more of the local branches of the system can be simply turned off, and the front end microcomputer 50, central data processor 18 and the remaining local branches will continue to function in the intended manner.

While only a particular embodiment of the invention has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. An apparatus for facilitating support, maintenance and management of a plurality of operator-supervised industrial machines that are located in a given plant area which is serviced in common by operator support and machine maintenance personnel, and which is characterized by an environment having a high audible noise level and low operator visibility, and a high electrical noise level such that common forms of audible, visual and electrical signal communication are unsuitable, comprising:

an operator-controlled input module for each machine, each said module incorporating a machine computer means and operator-actuated means for inputting into the associated machine computer means digitally encoded call data for requesting operator support assistance, and status data representing a condition of the operation or nonoperation of the associated machine;

first and second local computer means, said first local computer means being associated with a first group of said machines preselected from the total plurality of machines, and said second local computer means being associated with a second and different group of said machines preselected from the total plurality of machines, said first local computer means being jointly linked to all of said machine computer means in said input modules of said first group of machines and including means for sequentially polling said machine computer means so as to receive the digitally encoded call and status data therefrom, and said second local computer means being jointly linked to all of said machine computer means in said input modules of said second group of machines and including means for sequentially polling said machine computer means so as to receive the digitally encoded call and status data therefrom;

first and second electrical signal controlled visual paging display means mounted in the plant area and being respectively associated with said first and second groups of machines;

first and second display computer means for receiving and decoding the digitally encoded call data and for respectively controlling said first and second visual paging display means so as to cause the call data to be visually displayed in the plant area, said first display computer means being linked to said first local computer means and including interrupt means for causing the call data in said first local computer means to be transmitted to said first display computer means, and said second display computer means being linked to said second local computer means and including interrupt means for causing the call data in said second local computer means to be transmitted to said second display computer means;

front end computer means, each of said first and second local computer means being linked to said front end computer means over separate digital data transmission paths, said front end computer means including means for sequentially polling each of said first and second local computer means for call and status data originating at the first and second groups of machines respectively, and means for receiving and storing such call and status data developed in response to said means for polling, and said front end computer means further including interrupt means for transmitting said call data received and stored in said front end computer means to each of said first and second local computer means such that call data received by said front end computer means from both said first and second local computer means is routed back to each of said first and second local computer means and hence to the associated first and second display computer means for causing said first and second display means to visually present call data originating in either said first or second groups of machines; and data processing means for utilizing said call and status data stored in said front end computer means.

2. The apparatus of claim 1, wherein each of said input modules comprises feedback indicator light means mounted so as to be visible by the machine operator, and each of said machine computer means includes means for energizing said indicator light means in response to the associated operator-actuated means so as to acknowledge to the operator that the digitally encoded call and status data has been entered into the associated machine computer means.

3. The apparatus of claim 1, wherein said machine computer means, display computer means, and local computer means comprise identical microprocessors.

4. The apparatus of claim 1, wherein said machine computer means, display computer means, local computer means and said front end computer means comprise identical microprocessors.

5. The apparatus of claim 1, wherein said front end computer means comprises a microprocessor based microcomputer and said data processing means comprises a general purpose programmable computer linked to said front end computer means for receiving, compiling and report formatting of call and status data collected by said front end computer means.

6. The apparatus of claim 1, further comprises a party line serial data transfer means for jointly linking said first local computer means to all of said machine computer means of the first group of machines.

7. The apparatus of claim 6 wherein said party line serial data transfer means comprises at least one common current data loop extending from said first local computer means and separate means for coupling each of said machine computer means of said first group of machines to said common current data loop.

8. The apparatus of claim 7, wherein said first display computer means is jointly linked, along with said machine computer means of said first group of machines to said first local computer means, and further comprising means for coupling said first display computer means to said common current data loop.

9. The apparatus of claim 7, wherein each of said means for coupling said machine computer means to said common current data loop comprises an optical isolator.

10. The apparatus of claim 1 wherein said first and second local computer means are disposed at separate locations on the plant floor respectively adjacent the first and second groups of machines, and further comprising CRT and keyboard terminal means for at least said first local computer means for retrieving and displaying call and status data from said front end computer means via said first local computer means.

11. In an industrial machine support system that has a plurality of operator-actuated input modules, one at each of a corresponding plurality of industrial machines, for generating digitally encoded call signals that represent requests for operator assistance, and that has a plurality of signal controlled visual paging displays disposed in a plant area where the industrial machines are located, the improvement comprising:

a separate machine microcomputer means for each of said input modules for receiving and storing said call signals;

first and second local microcomputer means, said first local microcomputer means being associated with a first group of said machines and their corresponding input modules, said second local microcomputer means being associated with a second and different group of said plurality of machines and their corresponding input modules;

first and second display microcomputer means for receiving, decoding and displaying digitally encoded call signals and for controlling separate ones of said displays so as to cause said call signals received by said first and second display microcomputer means to be visually displayed in the plant area;

first digital signal linking means for jointly linking said first local microcomputer means with each of said machine microcomputer means for said first group of machines and with said first display microcomputer means, and second digital signal linking means for jointly linking said second local microcomputer means with each of said machine microcomputer means for said second group of machines and with said second display microcomputer means;

said first local microcomputer means including means for sequentially polling said machine microcomputer means for said first group of machines so as to receive and store the digitally encoded call signals held in such machine microcomputer means, and said second local microcomputer means including means for sequentially polling said machine microcomputer means for said second group of machines so as to receive and store the digitally encoded call signals held in such machine microcomputer means;

said first and second display microcomputer means each including means for receiving the call signals stored in said first and second local microcomputer means, respectively, and said first and second local microcomputer means each including interrupt means for transmitting call signals stored therein to said first and second display microcomputer means respectively;

and front end computer means linking each of said first and second local microcomputer means, said front end microcomputer means including means for sequentially polling each of said first and second local microcomputer means for call signals originating at machines in the first and second groups of machines, respectively, and including means for receiving and storing such call signals developed in response to said means for polling, and said front end computer means further including interrupt means for transmitting call signals stored therein to each of said first and second local microcomputer means.

12. In an industrial machine support system that has a plurality of operator-actuated input modules, one at each of a corresponding plurality of operator-supervised machines, for generating digitally encoded call signals that represent requests for operator assistance, and that has a signal controlled visual paging display disposed in a plant area where operator support personnel are located, the improvement comprising:

a distributed microcomputer network interconnecting said operator-actuated input modules and said paging display, said network comprising:
- a separate machine microcomputer for each of said input modules for receiving and storing said call signals;
- a display microcomputer means for receiving and decoding said call signals, and including means for operating said paging display so as to cause calls represented by said call signals to be visually displayed thereon;
- local microcomputer means;
- digital data linking means for linking said local microcomputer means jointly to said machine microcomputer means and to said display microcomputer means, said digital data linking means comprising at least one common current data loop extending from said local microcomputer means serially to said machine and display microcomputer means and a plurality of separate coupling means each connected in series with said loop for coupling each of said machine and display microcomputer means to said digital data linking means; and
- said local microcomputer means including means for sequentially polling said machine microcomputer means for call signals held therein and means for accumulating and storing said call signals developed in response to said means for polling, and said local microcomputer means including interrupt means for transmitting call signals held in said local microcomputer means to said display microcomputer means.

13. The improvement in claim 12, wherein each of said separate coupling means is a photo-optical isolator.

* * * * *